US009690043B2

(12) United States Patent
Matsumoto

(10) Patent No.: US 9,690,043 B2
(45) Date of Patent: Jun. 27, 2017

(54) OPTICAL WAVEGUIDE, SPOT SIZE CONVERTER AND OPTICAL APPARATUS

(71) Applicant: FUJITSU LIMITED, Kawasaki-shi, Kanagawa (JP)

(72) Inventor: Takeshi Matsumoto, Hadano (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/871,937

(22) Filed: Sep. 30, 2015

(65) Prior Publication Data

US 2016/0124148 A1 May 5, 2016

(30) Foreign Application Priority Data

Oct. 31, 2014 (JP) ................................ 2014-222791

(51) Int. Cl.
*G02B 6/02* (2006.01)
*G02B 6/122* (2006.01)
*G02B 6/126* (2006.01)

(52) U.S. Cl.
CPC .......... *G02B 6/1228* (2013.01); *G02B 6/126* (2013.01)

(58) Field of Classification Search
CPC ............ G02B 6/02; G02B 6/30; G02B 6/122
USPC .......................................................... 385/28
See application file for complete search history.

(56) References Cited

U.S. PATENT DOCUMENTS 6,937,797 B2 * 8/2005 Mizuno et al. ................ 385/43
7,251,406 B2 * 7/2007 Luo et al. .................... 385/131
7,664,352 B1 * 2/2010 Okayama ........................ 385/43
8,442,368 B1 * 5/2013 Reano et al. .................. 385/39
8,538,213 B2 * 9/2013 Uchida et al. ................. 385/43
2002/0146205 A1 * 10/2002 Shimoda ........................ 385/43
2003/0044118 A1 * 3/2003 Zhou et al. .................... 385/43
2003/0138216 A1 * 7/2003 Shimoda ........................ 385/50
2004/0057667 A1 * 3/2004 Yamada et al. ................ 385/43
2004/0067023 A1 * 4/2004 Hanashima et al. ........... 385/43
2004/0264902 A1 * 12/2004 Zoorob et al. ............... 385/129
2005/0135765 A1 * 6/2005 Nakata et al. ............... 385/129

(Continued)

FOREIGN PATENT DOCUMENTS

JP 08-171020 7/1996
JP 10-214958 8/1998

(Continued)

OTHER PUBLICATIONS

Fuad E. Doany et al., "Multichannel High-Bandwidth Coupling of Ultradense Silicon Photonic Waveguide Array to Standard-Pitch Fiber Array", Journal of Lightwave Technology, vol. 29, No. 4, Feb. 15, 2011, pp. 475-482 (8 pages).

*Primary Examiner* — Kaveh C Kianni
(74) *Attorney, Agent, or Firm* — Fujitsu Patent Center

(57) ABSTRACT

An optical waveguide includes a waveguide core including a first region, a second region having a step at which a thickness varies, and a third region having a thickness smaller than that of the first region. The second region has thick film regions continuing with the first region and positioned at both sides in a widthwise direction. The thick film regions have a thickness that is equal to that of the first region and have a gradually reducing width from the first region side to the third region side. The second region further has a thin film region sandwiched by the thick film regions and continuing with the third region. The thin film region has a thickness equal to that of the third region.

19 Claims, 29 Drawing Sheets

1A
1B
1C
A
1Y
B
1Z
C
1
A
1X
B
1Y
C
2

(56) References Cited

U.S. PATENT DOCUMENTS

| | | | | |
|---|---|---|---|---|
| 2007/0110379 | A1* | 5/2007 | West et al. | 385/129 |
| 2009/0087144 | A1* | 4/2009 | Yoshida | 385/43 |
| 2010/0086255 | A1* | 4/2010 | Ishizaka | 385/31 |
| 2010/0092128 | A1* | 4/2010 | Okayama | 385/14 |
| 2010/0111468 | A1* | 5/2010 | Funabashi et al. | 385/14 |
| 2010/0266288 | A1* | 10/2010 | Little et al. | 398/139 |
| 2011/0026880 | A1* | 2/2011 | Galli et al. | 385/28 |
| 2011/0116741 | A1* | 5/2011 | Cevini et al. | 385/28 |
| 2011/0194572 | A1* | 8/2011 | Yamazaki et al. | 372/6 |
| 2011/0205660 | A1* | 8/2011 | Komura et al. | 360/59 |
| 2011/0292774 | A1* | 12/2011 | Osawa et al. | 369/13.33 |
| 2012/0230635 | A1* | 9/2012 | Yoshida | 385/43 |
| 2012/0294567 | A1* | 11/2012 | Osawa | 385/39 |
| 2013/0170807 | A1* | 7/2013 | Hatori et al. | 385/129 |
| 2013/0188910 | A1 | 7/2013 | Tokushima et al. | |
| 2014/0044391 | A1* | 2/2014 | Iizuka et al. | 385/14 |
| 2014/0233881 | A1* | 8/2014 | Hatori et al. | 385/14 |
| 2014/0233901 | A1* | 8/2014 | Hatori et al. | 385/129 |
| 2014/0294341 | A1* | 10/2014 | Hatori et al. | 385/14 |
| 2015/0086153 | A1* | 3/2015 | Ono et al. | 385/11 |
| 2015/0303653 | A1* | 10/2015 | Tanaka | 385/14 |

FOREIGN PATENT DOCUMENTS

| | | |
|---|---|---|
| JP | 2002-156539 | 5/2002 |
| JP | 2010-54929 | 3/2010 |
| JP | 2012-83446 | 4/2012 |

* cited by examiner

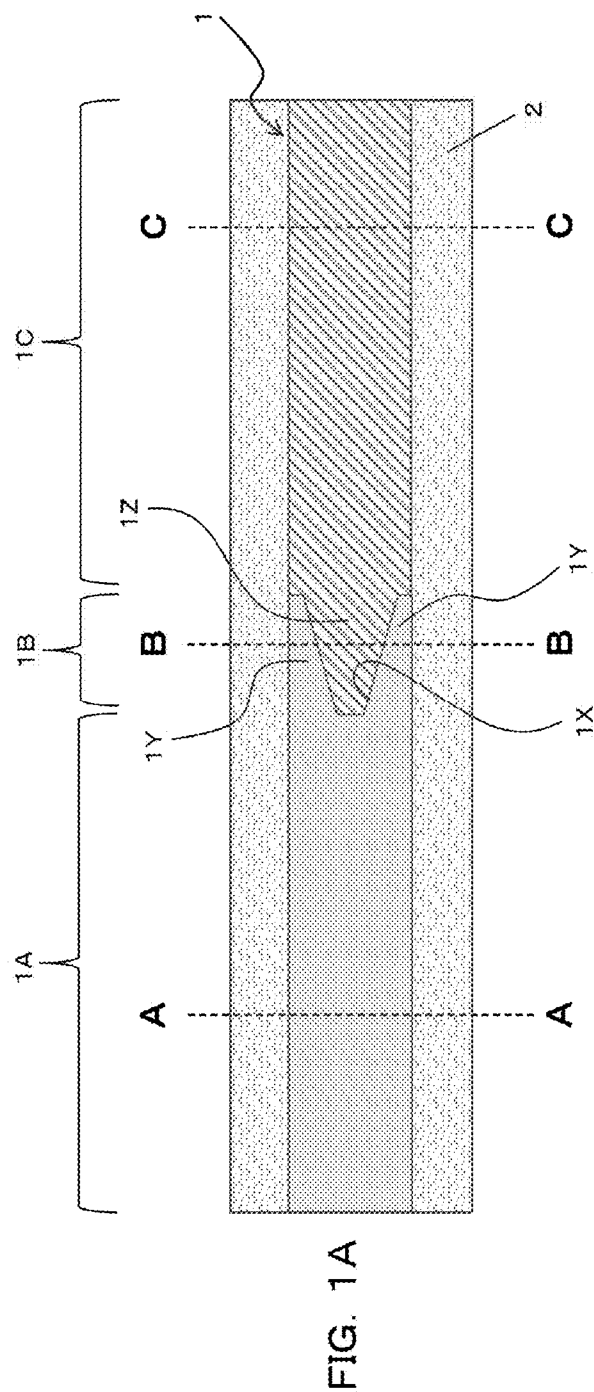
FIG. 1A
FIG. 1B
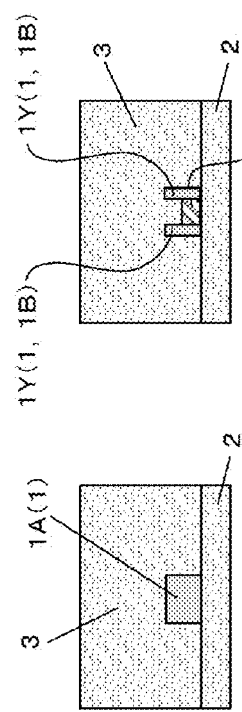
FIG. 1C
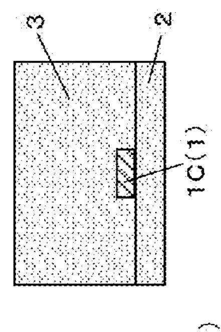
FIG. 1D

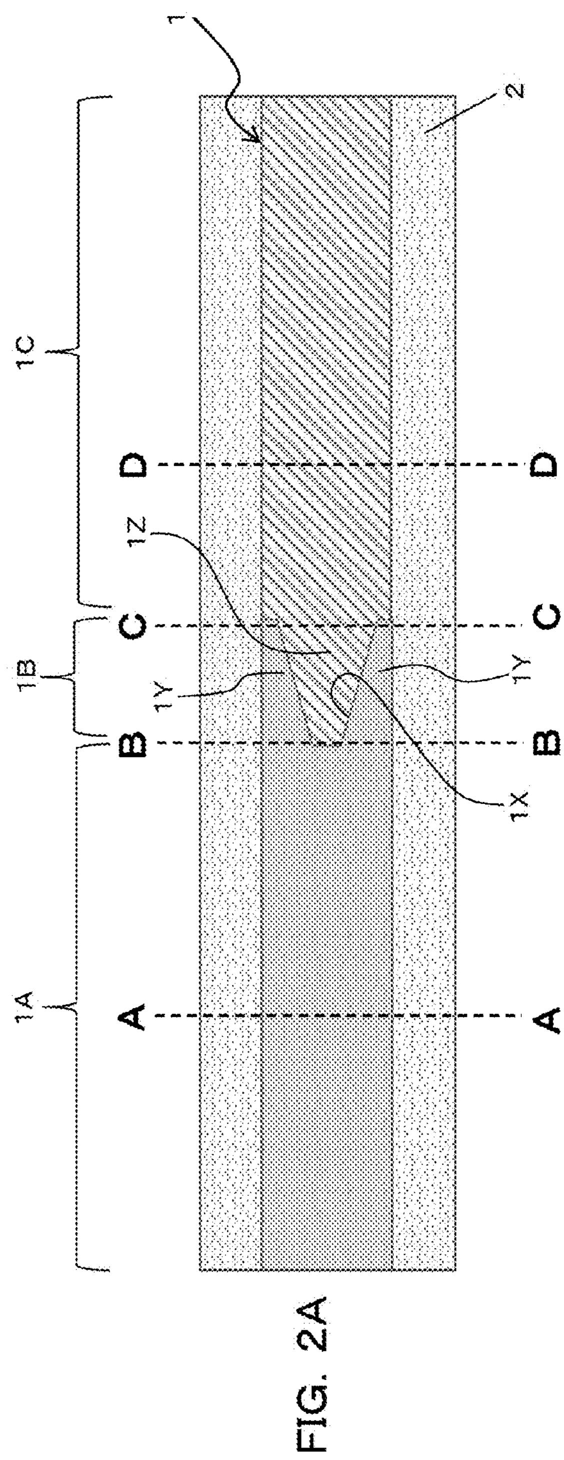
FIG. 2A
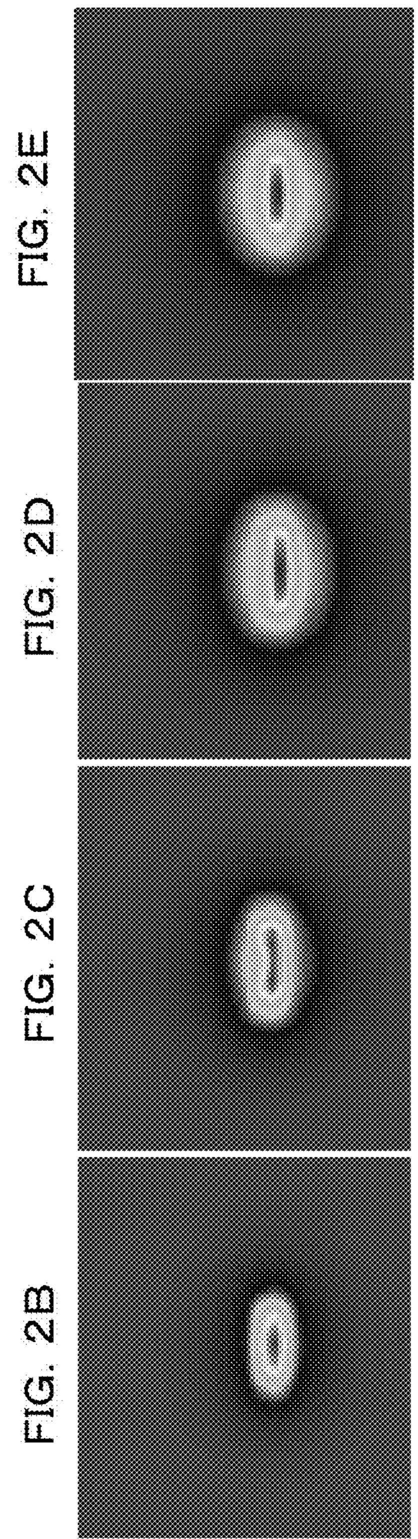
FIG. 2B
FIG. 2C
FIG. 2D
FIG. 2E

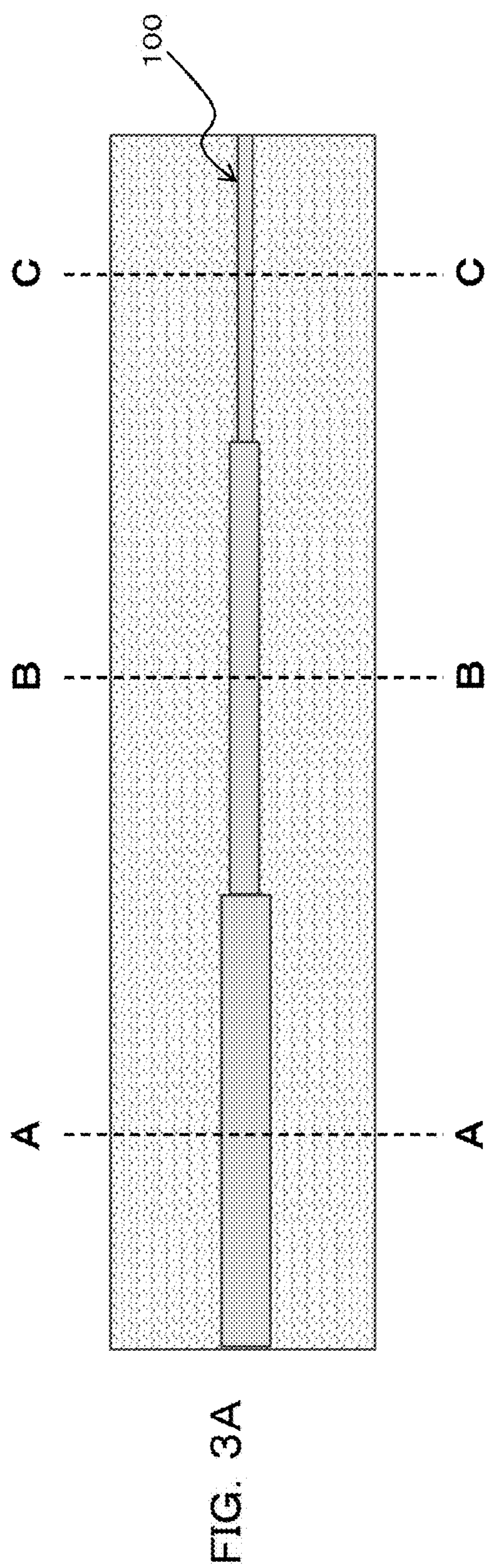
100
C
C
B
B
A
A
FIG. 3A
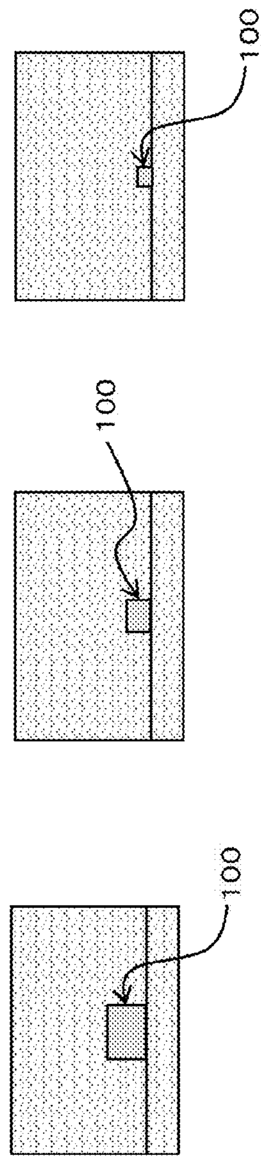
100
FIG. 3D
100
FIG. 3C
100
FIG. 3B

LOSS (dB)
0
-1
-2
-3
0
20
40
60
80
100
STEP AMOUNT (nm)
TE
TM

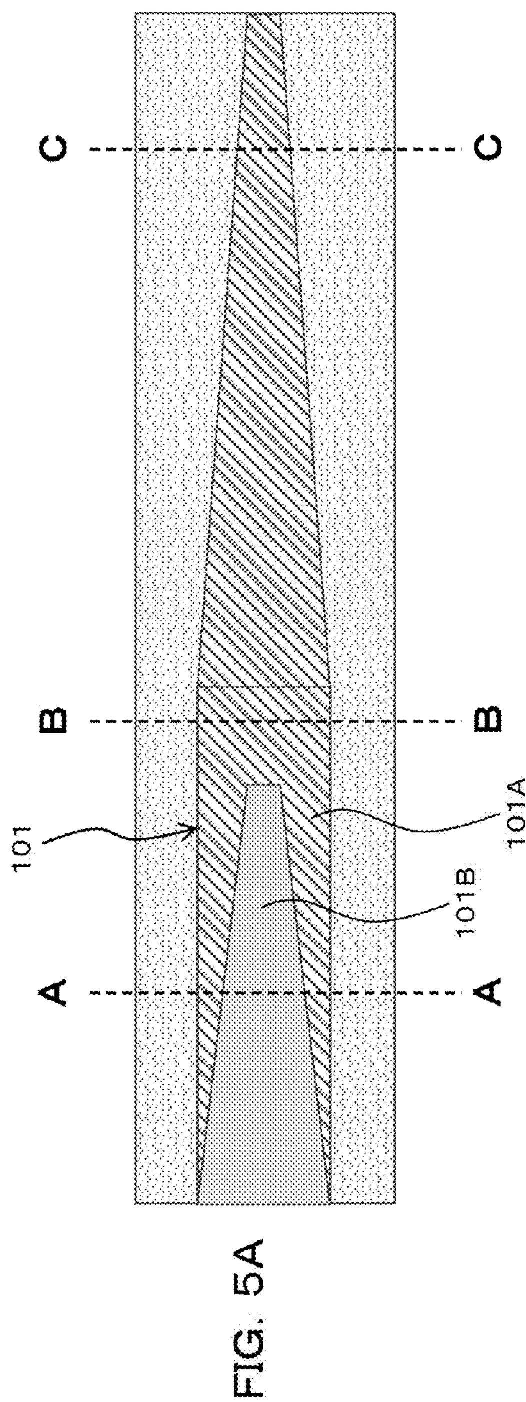
FIG. 5A
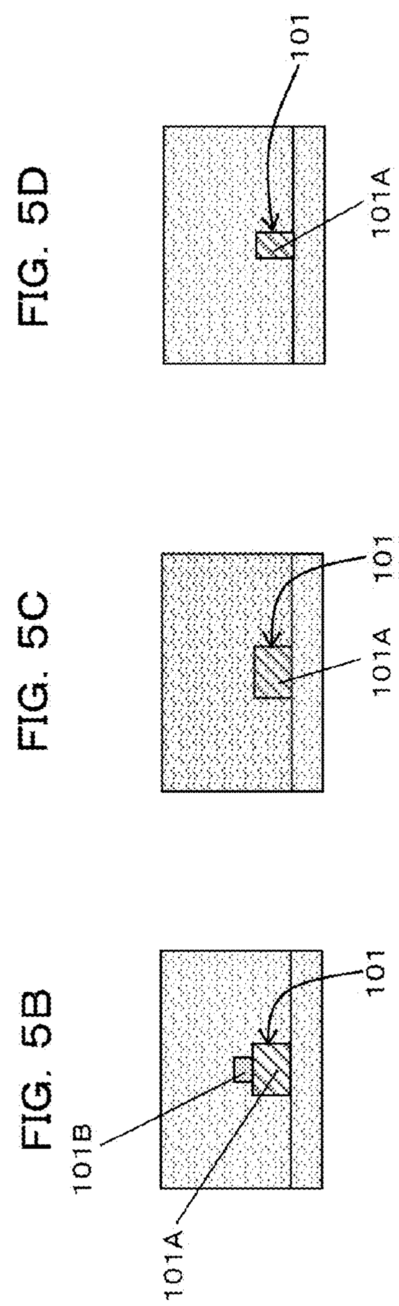
FIG. 5B
FIG. 5C
FIG. 5D 1
2
1C
1Z
1Y
1B
1X
1Y
1A 1
2
1C
1Z
1Y
1B
1X
1Y
1A 1A(1D)
1B(1D)
1C(1D)
1E
1A(1D, 1)
1Y(1, 1B, 1D)
1Z(1, 1B, 1D)
1C(1, 1D)
1E(1)
1X
1Y
1Z
A
B
C
D
E

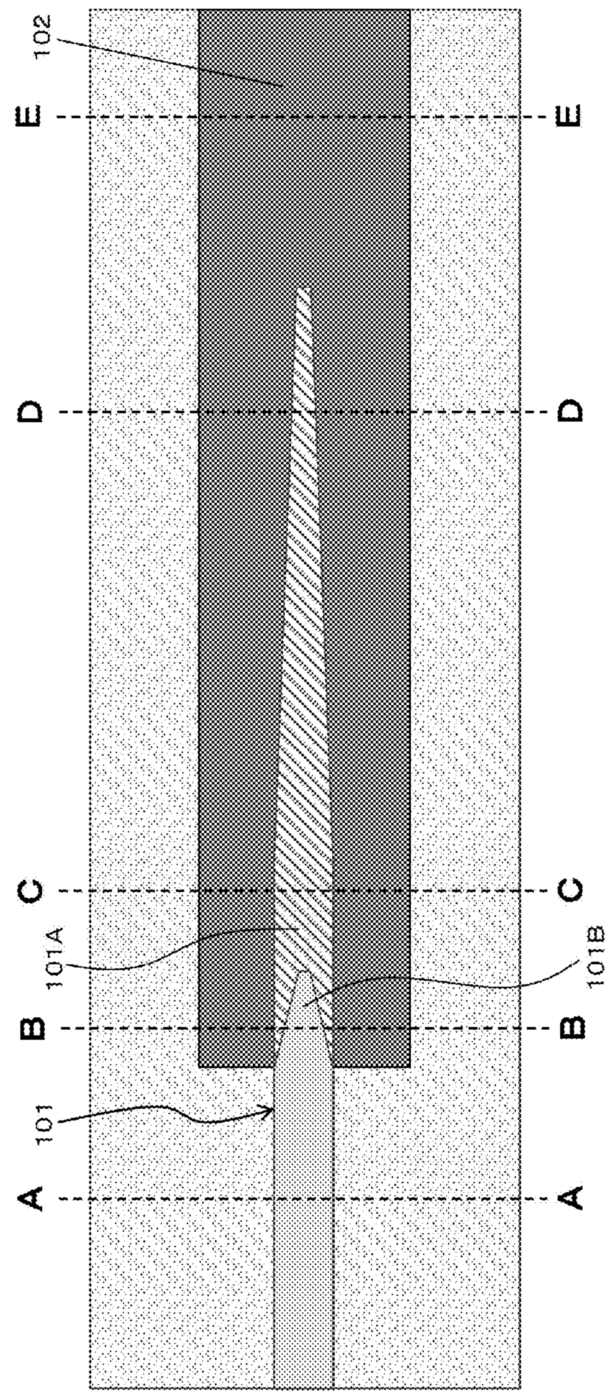
FIG. 19A
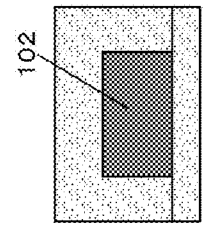
FIG. 19F
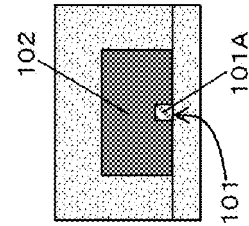
FIG. 19E
FIG. 19D
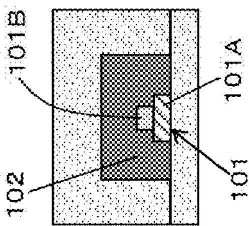
FIG. 19C
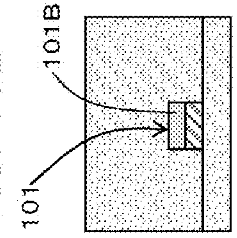
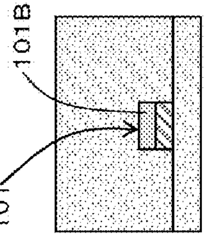
FIG. 19B

A
A
2(11)
1E(1, 12)
1C(1, 12)
1Z(1B, 1, 12)
16(3)
13Y(13, 3)

2(11)
1E(1, 12)
1C(1, 12)
1Z(1B, 1, 12)
16(3)
13Y(13, 3)

A
A
2(11)
1E(1, 12)
1C(1, 12)
1Z(1B, 1, 12)
16(3)
13Y(13, 3)

2(11)
1E(1, 12)
1C(1, 12)
1Z(1B, 1, 12)
16(3)
13Y(13, 3)

4
2
1XB
1XA
1

OPTICAL WAVEGUIDE, SPOT SIZE CONVERTER AND OPTICAL APPARATUS

CROSS-REFERENCE TO RELATED APPLICATION

This application is based upon and claims the benefit of priority of the prior Japanese Patent Application No. 2014-222791, filed on Oct. 31, 2014, the entire contents of which are incorporated herein by reference.

FIELD

The embodiments discussed herein are related to an optical waveguide, a spot size converter and an optical apparatus.

BACKGROUND

In recent years, the information amount has drastically increased by spreading of high definition video distribution, and improvement in the information processing capability of a data center or the like is demanded. Further, it is demanded to implement improvement of the information processing capacity by a low-cost and low-power consumption device, and, in recent years, silicon photonics is investigated lively.

For example, it has been proposed to vary the dimensions in both of a thicknesswise direction and a widthwise direction of a waveguide core stepwise in order to couple different devices with low loss. This is referred to as first technology.

Also it has been proposed to achieve spot size conversion with low loss, for example, by forming a waveguide core such that the width of an upper waveguide layer formed at a central position in a widthwise direction on a lower waveguide layer is reduced to allow an optical distribution to transit from the upper waveguide layer to the lower waveguide layer. This is referred to as second technology.

Further, since the cross sectional shape of a silicon waveguide core used for such silicon photonics as described above is so small as, for example, approximately 500 nm in width and approximately 220 nm in height, a mismatch with the spot size (for example, approximately several μm to 10 μm) of an optical fiber occurs. This gives rise to excessive coupling loss.

Therefore, a spot size converter has been proposed in which, in order to suppress excessive coupling loss, the width of the silicon waveguide core is reduced in a taper shape and the silicon waveguide core is covered with a second core to cause light to transit from the silicon waveguide core to the second core thereby to increase the spot size. This is referred to as second core type spot size converter.

SUMMARY

According to an aspect of the embodiment, an optical waveguide includes a waveguide core including a first region, a second region having a step at which a thickness varies, and a third region having a thickness smaller than that of the first region, wherein the second region has thick film regions continuing with the first region and positioned at both sides in a widthwise direction, the thick film regions having a thickness that is equal to that of the first region and having a gradually reducing width from the first region side to the third region side, and has a thin film region sandwiched by the thick film regions and continuing with the third region, the thin film region having a thickness equal to that of the third region.

According to an aspect of the embodiment, a spot size converter includes a first silicon waveguide core including a first region, a second region having a step at which a thickness varies, and a third region having a thickness smaller than that of the first region, the first silicon waveguide core having a fixed width region having a fixed width and a width taper region continuing the fixed width region and having a width that reduces toward a terminal end portion, and a second waveguide core that covers at least the width taper region and continues with the first silicon waveguide core, wherein the second region has thick film regions continuing with the first region and positioned at both sides in a widthwise direction, the thick film regions having a thickness that is equal to that of the first region and having a gradually reducing width from the first region side to the third region side, and has a thin film region sandwiched by the thick film regions and continuing with the third region, the thin film region having a thickness equal to that of the third region.

According to an aspect of the embodiment, an optical apparatus includes the spot size converter described above and a dispersion-shifted fiber or a single-mode fiber connected to an end face of the second waveguide core side of the spot size converter.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF DRAWINGS

FIGS. 1A to 1D are schematic views depicting a configuration of an optical waveguide according a first embodiment and a particular example, wherein FIG. 1A is a top plan view; FIG. 1B a sectional view taken along line A-A of FIG. 1A; FIG. 1C a sectional view taken along line B-B of FIG. 1A; and FIG. 1D a sectional view taken along line C-C of FIG. 1A;

FIGS. 2A to 2E are views illustrating mode shapes at locations of the optical waveguide according to the first embodiment and the particular example, wherein FIG. 2A is a schematic top plan view depicting a configuration of the optical waveguide; FIG. 2B a view depicting a mode shape at a location along line A-A of FIG. 2A; FIG. 2C a view depicting a mode shape at a location along line B-B of FIG. 2A; FIG. 2D a view depicting a mode shape at a location along line C-C of FIG. 2A; and FIG. 2E a view depicting a mode shape at a location along line D-D of FIG. 2A;

FIGS. 3A to 3D are schematic views depicting a configuration of an optical waveguide of a comparative example 1, wherein FIG. 3A is a top plan view; FIG. 3B a sectional view taken along line A-A of FIG. 3A; FIG. 3C a sectional view taken along line B-B of FIG. 3A; and FIG. 3D a sectional view taken along line C-C of FIG. 3A;

FIGS. 5A to 5D are schematic views depicting a configuration of an optical waveguide of a comparative example 2, wherein FIG. 5A is a top plan view; FIG. 5B a sectional view taken along line A-A of FIG. 5A; FIG. 5C a sectional view taken along line B-B of FIG. 5A; and FIG. 5D a sectional view taken along line C-C of FIG. 5A;

FIGS. 8A and 8B are views depicting results when loss where the step amount is varied is calculated in the optical waveguide according to the first embodiment and the particular example, wherein FIG. 8A depicts a result when loss of TE polarization is calculated and FIG. 8B depicts a result when loss of TM polarization is calculated;

FIGS. 9A and 9B are schematic views illustrating a fabrication method for the optical waveguide according to the particular example of the present embodiment, wherein FIG. 9A is a top plan view and FIG. 9B is a sectional view taken along line A-A of FIG. 9A;

FIGS. 10A and 10B are schematic views illustrating a fabrication method for the optical waveguide according to the particular example of the present embodiment, wherein FIG. 10A is a top plan view and FIG. 10B is a sectional view taken along line A-A of FIG. 10A;

FIGS. 11A and 11B are schematic views illustrating a fabrication method for the optical waveguide according to the particular example of the present embodiment, wherein FIG. 11A is a top plan view and FIG. 11B is a sectional view taken along line A-A of FIG. 11A;

FIGS. 12A and 12B are schematic views illustrating a fabrication method for the optical waveguide according to the particular example of the present embodiment, wherein FIG. 12A is a top plan view and FIG. 12B is a sectional view taken along line A-A of FIG. 12A;

FIGS. 13A and 13B are schematic views illustrating a fabrication method for the optical waveguide according to the particular example of the present embodiment, wherein FIG. 13A is a top plan view and FIG. 13B is a sectional view taken along line A-A of FIG. 13A;

FIGS. 14A and 14B are schematic views illustrating a fabrication method for the optical waveguide according to the particular example of the present embodiment, wherein FIG. 14A is a top plan view and FIG. 14B is a sectional view taken along line A-A of FIG. 14A;

FIGS. 18A to 18F are schematic views depicting a configuration of a spot size converter according to a second embodiment and a particular example, wherein FIG. 18A is a top plan view; FIG. 18B a sectional view taken along line A-A of FIG. 18A; FIG. 18C a sectional view taken along line B-B of FIG. 18A; FIG. 18D a sectional view taken along line C-C of FIG. 18A; FIG. 18E a sectional view taken along line D-D of FIG. 18A; and FIG. 18F a sectional view taken along line E-E of FIG. 18A;

FIGS. 19A to 19F are schematic views depicting a configuration of a spot size converter to which the structure of the waveguide core of the comparative example 2 with the first embodiment is applied, wherein FIG. 19A is a top plan view; FIG. 19B a sectional view taken along line A-A of FIG. 19A; FIG. 19C a sectional view taken along line B-B of FIG. 19A; FIG. 19D a sectional view taken along line C-C of FIG. 19A; FIG. 19E a sectional view taken along line D-D of FIG. 19A; and FIG. 19F a sectional view taken along line E-E of FIG. 19A;

FIGS. 20A and 20B are a schematic view illustrating a fabrication method for a spot size converter according to a particular example of a second embodiment, wherein FIG. 20A is a top plan view and FIG. 20B is a sectional view taken along line A-A of FIG. 20A;

FIGS. 21A and 21B are a schematic view illustrating the fabrication method for the spot size converter according to the particular example of the second embodiment, wherein FIG. 21A is a top plan view and FIG. 21B is a sectional view taken along line A-A of FIG. 21A;

FIGS. 22A and 22B are a schematic view illustrating the fabrication method for the spot size converter according to the particular example of the second embodiment, wherein FIG. 22A is a top plan view and FIG. 22B is a sectional view taken along line A-A of FIG. 22A;

FIGS. 23A and 23B are a schematic view illustrating the fabrication method for the spot size converter according to the particular example of the second embodiment, wherein FIG. 23A is a top plan view and FIG. 23B is a sectional view taken along line A-A of FIG. 23A;

FIGS. 24A and 24B are a schematic view illustrating the fabrication method for the spot size converter according to the particular example of the second embodiment, wherein FIG. 24A is a top plan view and FIG. 24B is a sectional view taken along line A-A of FIG. 24A;

FIGS. 25A and 25B are a schematic view illustrating the fabrication method for the spot size converter according to the particular example of the second embodiment, wherein FIG. 25A is a top plan view and FIG. 25B is a sectional view taken along line A-A of FIG. 25A;

FIGS. 26A and 26B are a schematic view illustrating the fabrication method for the spot size converter according to the particular example of the second embodiment, wherein FIG. 26A is a top plan view and FIG. 26B is a sectional view taken along line A-A of FIG. 26A;

FIGS. 27A and 27B are a schematic view illustrating the fabrication method for the spot size converter according to the particular example of the second embodiment, wherein FIG. 27A is a top plan view and FIG. 27B is a sectional view taken along line A-A of FIG. 27A;

FIGS. 28A and 28B are a schematic view illustrating the fabrication method for the spot size converter according to the particular example of the second embodiment, wherein FIG. 28A is a top plan view and FIG. 28B is a sectional view taken along line A-A of FIG. 28A.

DESCRIPTION OF EMBODIMENTS

Figure 4:
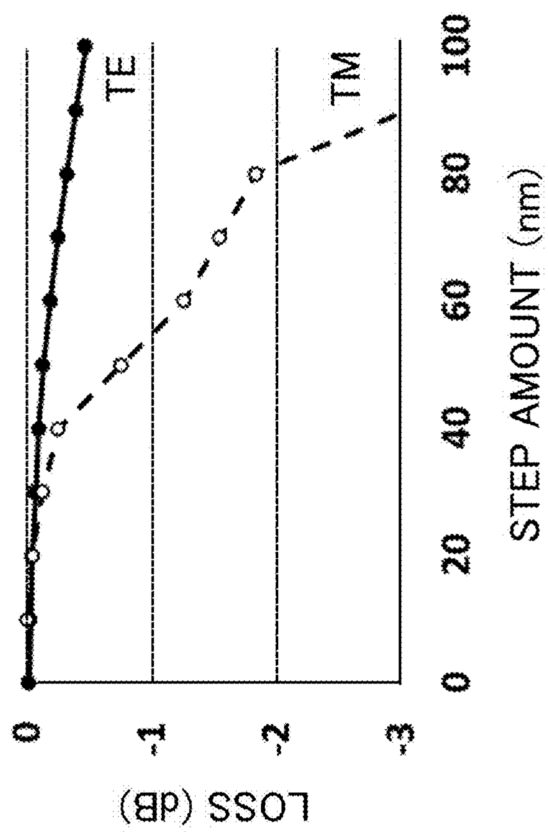
FIG. 4 is a view depicting a result when loss in the optical waveguide of the comparative example 1 is calculated.
Figure 6:
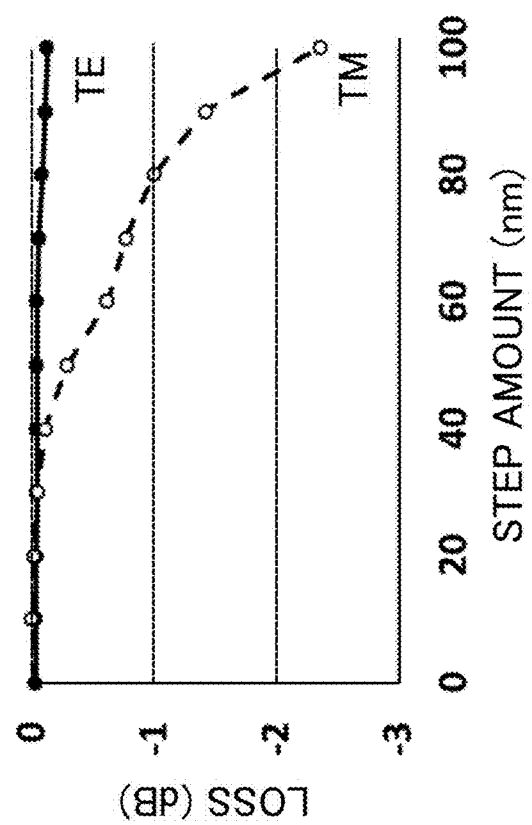
FIG. 6 is a view depicting a result when loss in the optical waveguide of the comparative example 2 is calculated.

However, in the first technology described above, the loss at a step at which the size varies stepwise is high. Further, the loss of TM polarization (TM polarization component) is high with respect to TE polarization (TE polarization component) and the polarization dependency is high. Further, where the size in a thicknesswise direction varies stepwise, the difficulty in process is high and the fabrication is not easy.

Meanwhile, in the second technology described above, the optical distribution transits gradually from the upper waveguide layer to the lower waveguide layer by reducing the width of the upper waveguide layer formed at a central position in the widthwise direction on the lower waveguide layer. Therefore, the influence of the step corresponding to the thickness of the upper waveguide layer can be suppressed. Consequently, in the second technology described above, suppression of the loss to a low level can be implemented in comparison with that of the first technology described hereinabove. However, the loss of TM polarization with respect to TE polarization is still high, and the polarization dependency is high. Further, while it is a possible idea to reduce the width at a tip end portion of the upper waveguide layer in order to implement suppression of the loss to a low level and a low polarization dependency, it is difficult to reduce the width of the tip end portion of the upper waveguide layer, for example, because the such reduction is limited by the exposure accuracy. Therefore, the fabrication of the waveguide layer is not easy.

Therefore, it is desirable to facilitate fabrication of a region of a waveguide core in which the waveguide core has a step at which the thickness of the waveguide core varies and implement suppression of loss to a low level and a low polarization dependency.

In the following, an optical waveguide, a spot size converter and an optical apparatus according to embodiments of the present technology are described with reference to the drawings.

First Embodiment

First, an optical waveguide according to the present embodiment is described with reference to FIGS. 1A to 17.

As depicted in FIGS. 1A to 1D, the optical waveguide according to the present embodiment includes a waveguide core 1 (here, a silicon waveguide core) having a first region 1A, a second region 1B having a step 1X at which the thickness varies, and a third region 1C having a thickness smaller than that of the first region 1A. Here, the second region 1B continues to one side of the first region 1A and the third region 1C continues to one side of the second region 1B. It is to be noted that the optical waveguide including the silicon waveguide core 1 is provided, for example, in a silicon optical device formed on a silicon substrate. It is to be noted that the silicon optical device is referred to sometimes as optical semiconductor device. It is to be noted that, in FIGS. 1A to 1D, for facilitation of understandings of the description, patterns different from each other are applied to a region of the waveguide core 1 in which the thickness is small and another region of the waveguide core 1 in which the thickness is great.

The second region 1B includes thick film regions 1Y that are positioned at both sides in the widthwise direction in a continuing relationship with the first region 1A and have a thickness equal to that of the first region 1A and besides have a width gradually reducing from the side of the first region 1A to the side of the third region 1C (namely, from the great thickness side to the small thickness side) and a thin film region 1Z that is sandwiched by the thick film regions 1Y and continuing to the third region 1C and has a thickness equal to that of the third region 1C. In this second region 1B, the step 1X exists at the boundary between the thick film regions 1Y and the thin film region 1Z.

Here, the thin film region 1Z is positioned at a central location in the widthwise direction in a continuing relationship with the third region 1C and has a thickness equal to that of the third region 1C, and has a width gradually reducing from the side of the third region 1C to the side of the first region 1A (namely, from the small thickness side to the great thickness side). In this case, the thin film region 1Z has a width gradually increasing from the side of the first region 1A to the side of the third region 1C.

In the present embodiment, the waveguide core 1 has a fixed width. In particular, the first region 1A, second region 1B and third region 1C configuring the waveguide core 1 have an equal width. The thick film regions 1Y of the second region 1B have a width gradually reducing in a taper shape (here, linear taper shape) from the side of the first region 1A to the side of the third region 1C. Therefore, the thin film region 1Z of the second region 1B has a width gradually increasing in a taper shape from the side of the first region 1A to the side of the third region 1C.

Further, the waveguide core 1 is configured so as to satisfy a single mode condition. In particular, the dimensions of the waveguide core 1, namely, the dimensions of the first region 1A, second region 1B and third region 1C configuring the waveguide core 1, are set so that light propagating in the core forms a single mode. Therefore, the optical waveguide including the waveguide core 1 is a single mode optical waveguide.

Further, in the present embodiment, the first region 1A is a thick film region that has a thickness equal in the longitudinal direction and the widthwise direction and has a great thickness equal to that of the thick film regions 1Y of the second region 1B. Further, the first region 1A continues to the thick film regions 1Y of the second region 1B. Therefore, the thick film region of the waveguide core 1 extends from the first region 1A to the second region 1B, and extends such that it is positioned in the overall region in the widthwise direction in the first region 1A and is positioned at both sides in the widthwise direction in the second region 1B and besides the width thereof gradually reduces.

Further, the third region 1C is a thin film region that has a thickness equal in the longitudinal direction and the widthwise direction and has a small thickness equal to that of the thin film region 1Z of the second region 1B. Further, the third region 1C continues to the thin film region 1Z of the second region 1B. Therefore, the thin film region of the waveguide core 1 extends from the third region 1C to the second region 1B, and extends such that it is positioned in the overall region in the widthwise direction in the third region 1C and is positioned at a central location in the widthwise direction in the second region 1B and besides the width thereof gradually reduces.

In this manner, the thick film region and the thin film region of the waveguide core 1 are connected to each other in the second region 1B such that the thick film regions 1Y are positioned at both sides in the widthwise direction and the thin film region 1Z is positioned at the central portion in the widthwise direction and besides the width of the regions 1Y and 1Z gradually vary. In other words, the step 1X (step structure) formed at the boundary location between the thick film region and thin film region of the waveguide core 1 is configured so as not to form a vertical face extending fully in the widthwise direction but to be projected such that the width of the thick film region gradually reduces at both sides of the portion in the widthwise direction so that the wall face functions as a step.

It is to be noted that the silicon waveguide core 1 is referred to sometimes as silicon core. Further, the first region 1A is referred to sometimes as first silicon core. Further, the second region 1B is referred to sometimes as second silicon core. Further, the third region 1C is referred to sometimes as third silicon core. Here, the second silicon core 1B is connected to an end portion of the first silicon core 1A and the third silicon core 1C is connected to an end portion of the second silicon core 1B. Further, the second silicon core 1B has the thin film region 1Z whose thickness is small at the central portion thereof and has the thick film regions 1Y whose thickness is great at both sides thereof. From the side of the first silicon core 1A having a great thickness toward the side of the third silicon core 1C having a small thickness, the width of the thick film regions 1Y of the second silicon core 1B gradually reduces while the width of the thin film region 1Z gradually increases.

Incidentally, a reason is described below why such a configuration as described above is applied.

In particular, for example, if both of the dimensions of a waveguide core 100 in the thicknesswise direction and the widthwise direction are varied stepwise as depicted in FIGS. 3A to 3D (comparative example 1), then since a step that varies stepwise in an orthogonal direction to a direction in which the waveguide core 100 extends is formed, the loss at the step increases. Further, the loss of TM polarization is high with respect to TE polarization and also the polarization dependency increases. For example, when the loss was calculated regarding such a structure as depicted in FIGS. 3A to 3D, for example, where the step amount was set to 70 nm as depicted in FIG. 4, the loss of TE polarization was 0.3 dB and the loss of TM polarization was 1.6 dB. Further, the loss of TM polarization was high with respect to TE polarization and the polarization dependency was high and also the loss (total loss) increased. Further, where the dimension in the thicknesswise direction is varied stepwise, the difficulty in a process is high, and fabrication is not easy. It is to be noted that an upper cladding layer is not depicted in FIG. 3A.

Further, for example, if the waveguide core 101 is configured such that the width of an upper waveguide layer 101B formed at a central position in the widthwise direction on a lower waveguide layer 101A is reduced and the light distribution transits from the upper waveguide layer 101B to the lower waveguide layer 101A as depicted in FIGS. 5A to 5D (comparative example 2), then the influence of a step corresponding to the thickness of the upper waveguide layer 101B can be suppressed. Therefore, suppression of loss to a low level can be implemented in comparison with an alternative case in which both of the dimensions of the waveguide core 101 in the thicknesswise direction and the widthwise direction are set so as to vary stepwise as described above (refer to FIGS. 3A to 3D). However, the loss of TM polarization with respect to TE polarization is still high and the polarization dependency is high. For example, when the loss was calculated regarding such a structure as depicted in FIGS. 5A to 5D, where the width of a tip end portion of the upper waveguide layer 101B was set to approximately 180 nm and the thickness of the upper waveguide layer 101B, namely, the step amount, was set to 70 nm taking a restriction by exposure accuracy upon fabrication, for example, by a KrF stepper into consideration, the loss of TE polarization was 0.1 dB and the loss of TM polarization was 0.8 dB. In this manner, while suppression of loss to a low level is implemented, the loss of TM polarization with respect to TE polarization is high and the polarization dependency is high. Further, while it seems a possible idea to reduce the width of a tip end portion of the upper waveguide layer 101B in order to implement suppression of loss to a low level and a low polarization dependency, it is difficult to reduce the width of the tip end portion of the upper waveguide layer 101B, for example, because reduction of the width is limited by exposure accuracy, and the fabrication is not easy. It is to be noted that an upper cladding layer is not depicted in FIG. 5A.

Therefore, in the present embodiment, such a configuration as described above is adopted in order to facilitate fabrication of a region having the step 1X at which the thickness of the waveguide core 1 varies and implement suppression of loss to a low level and a low polarization dependency.

By adopting such a configuration as described above, the step structure with which low loss and low polarization dependency can be implemented and which can be fabricated easily can be implemented.

Here, where such a configuration as described above is adopted, the mode shape (spot size) in the waveguide core 1 varies as depicted in FIGS. 2A to 2E. In particular, mode conversion little occurs at the boundary between the first region 1A and the second region 1B of the waveguide core 1, but mode conversion occurs in the second region 1B and then mode conversion into a mode shape similar to that of the third region 1C (third silicon core) occurs at the boundary between the second region 1B and the third region 1C. Therefore, the optical waveguide in the present embodiment having such a configuration as described above is sometimes considered as a spot size converter. It is to be noted that the upper cladding layer 3 is not depicted in FIG. 2A. Further, in FIG. 2A, for facilitation of illustration, patterns different from each other are applied to a thin region and a thick region of the waveguide core 1.

In this case, since loss little appears at the boundary between the first region 1A and the second region 1B, loss in the second region 1B of the waveguide core 1 depends upon how close a mode shape obtained by mode conversion at the boundary between the second region 1B and the third region 1C is to the mode shape of the third region C.

In particular, where such a configuration as described above is adopted, mode conversion (spot size conversion) is little performed and little loss appears at the first region 1A side of the second region 1B in which a tip end portion of the thin film region 1Z positioned at a central location of the second region 1B in the widthwise direction exists. Here, the width of the thin film region 1Z positioned at the central location of the second region 1B in the widthwise direction is in the minimum at the tip end portion of the side of the first region 1A, and the portion is influenced by exposure accuracy upon fabrication by a stepper. For example, where a KrF stepper is used for fabrication, since an influence of exposure accuracy appears, the width (minimum width) at the tip end portion of the thin film region 1Z can be reduced only to approximately 180 nm. However, since little loss appears at the first region 1A side of the second region 1B in which a tip end portion of the thin film region 1Z positioned at the central location of the second region 1B in the widthwise direction exists, little influence is had on implementation of suppression of loss to a low level and a low polarization dependency.

Figure 12A:
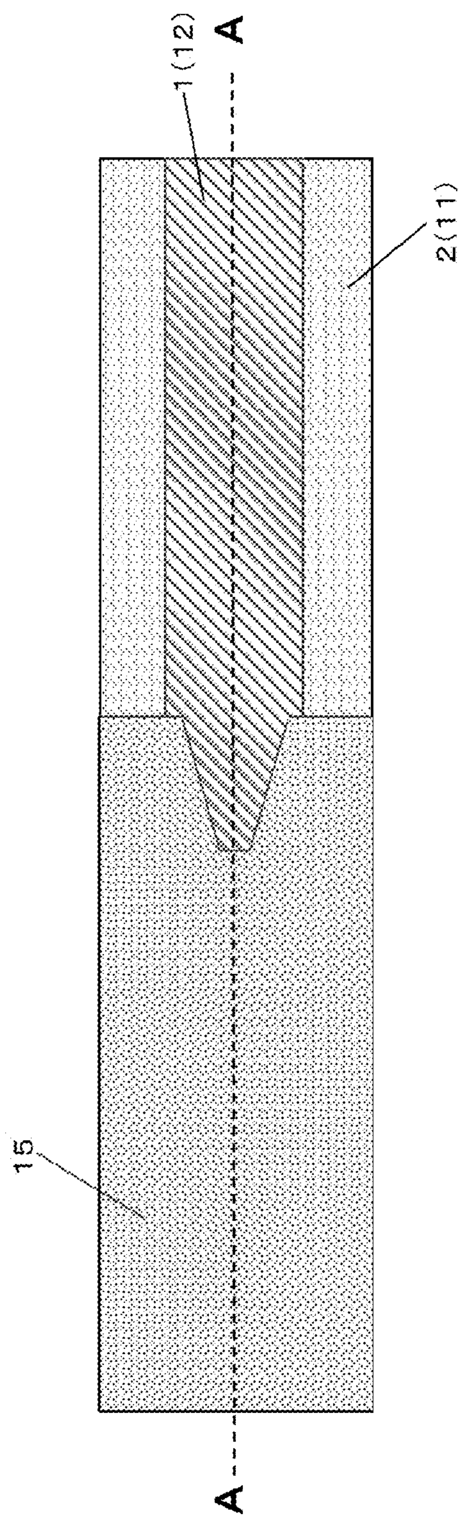
Figure 12B:
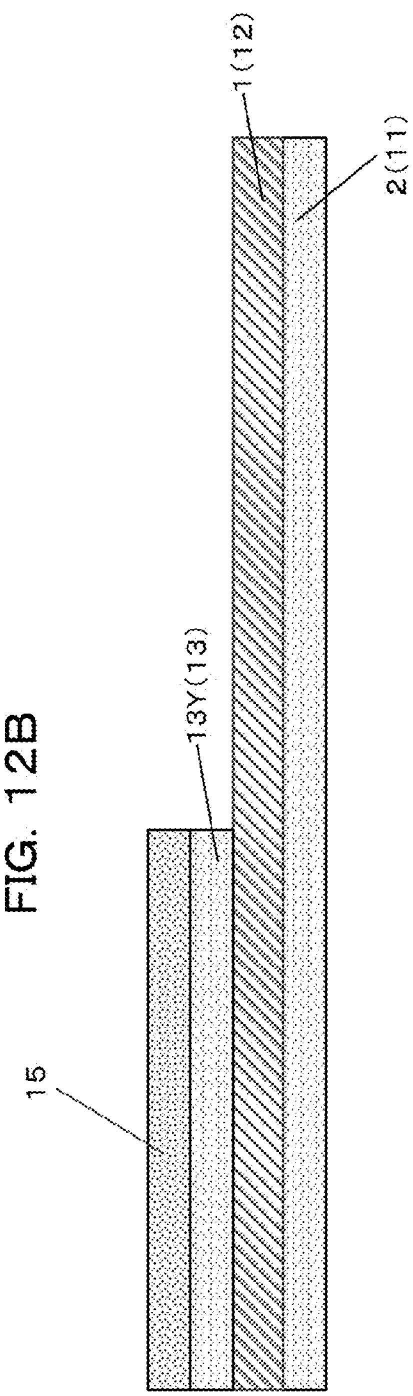

On the other hand, at the side of the third region 1C of the second region 1B in which a tip end portion of the thick film regions 1Y positioned at both sides of the second region 1B in the widthwise direction exists, it is difficult to implement suppression of loss to a low level and a low polarization dependency if mode conversion into a mode shape similar to that of the third region 1C is not achieved. Further, mode conversion into a mode shape closer to that of the third region 1C is performed at the third region 1C side of the second region 1B as the width of the tip end portion (tip end width) of the thick film regions 1Y positioned at both sides of the second region 1B in the widthwise direction reduces. Thus, suppression of loss to a low level and a low polarization dependency can be implemented. Here, the width of the thick film regions 1Y positioned at both sides of the second region 1B in the widthwise direction is in the minimum at a tip end portion of the side of the third region 1C. Where this portion is formed by a stepper, since such a resist pattern as depicted in FIGS. 12A and 12B of a fabrication procedure hereinafter described is used, the fabrication is not influenced by exposure accuracy. For example, even if the portion just described is fabricated using a KrF stepper, since it is not influenced by exposure accuracy, the width (minimum width) of the tip end portion of the thick film regions 1Y can be reduced to approximately 50 nm or less. In this manner, the width of the tip end portion of the thick film regions 1Y positioned at both sides of the second region 1B in the widthwise direction can be easily reduced without being influenced by exposure accuracy using a KrF stepper that is used popularly. Consequently, the mode conversion into a mode shape similar to that of the third region 1C is achieved at the third region 1C side of the second region 1B, and suppression of loss to a low level and a low polarization dependency can be implemented. In short, the mode conversion in the second region 1B, namely, in a region in which the step 1X at the boundary between the thick film regions 1Y and the thin film region 1Z exists, can be implemented more smoothly, and suppression of loss to a low level and a low polarization dependency can be implemented.

Figure 7:
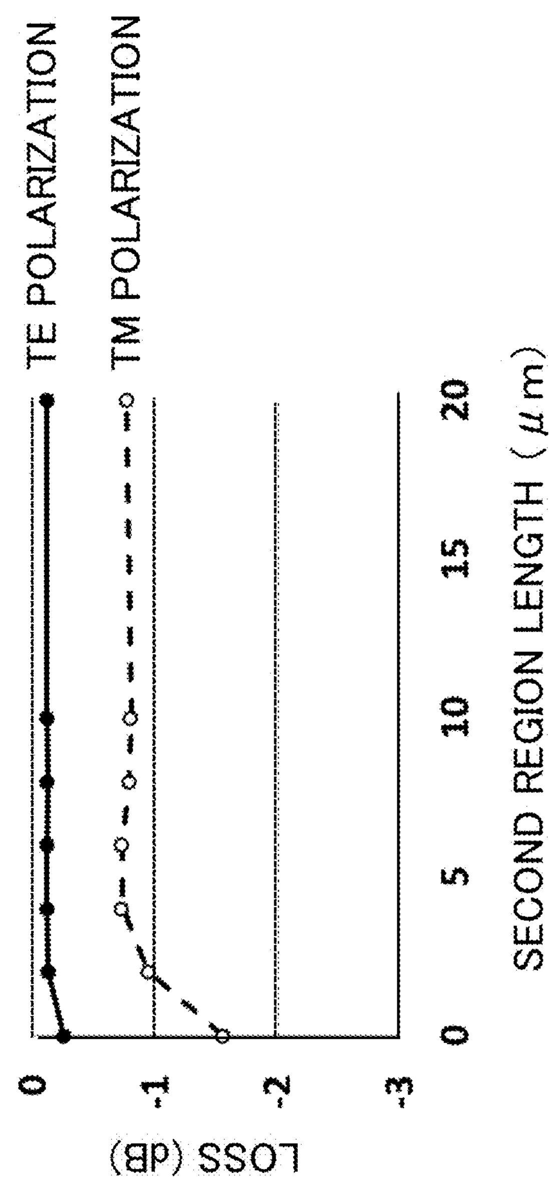
FIG. 7 is a view depicting a result when loss where the length of a second region is varied is calculated in the optical waveguide according to the first embodiment and the particular example.

Here, FIG. 7 depicts results when loss of TE polarization and TM polarization was calculated where the minimum width of the thick film regions 1Y of the second region 1B of the waveguide core 1 was set to 50 nm and the length of the second region 1B, namely, the length of the thick film regions 1Y, was varied.

It is recognized as depicted in FIG. 7 that, if the length of the second region 1B, namely, the length of the thick film regions 1Y, is set to 5 μm or more, then suppression of loss to a low level and a low polarization dependency can be implemented.

In this manner, it is preferable to configure the second region 1B, namely, the thick film regions 1Y, so as to have a length of 5 μm or more.

Figure 8A:
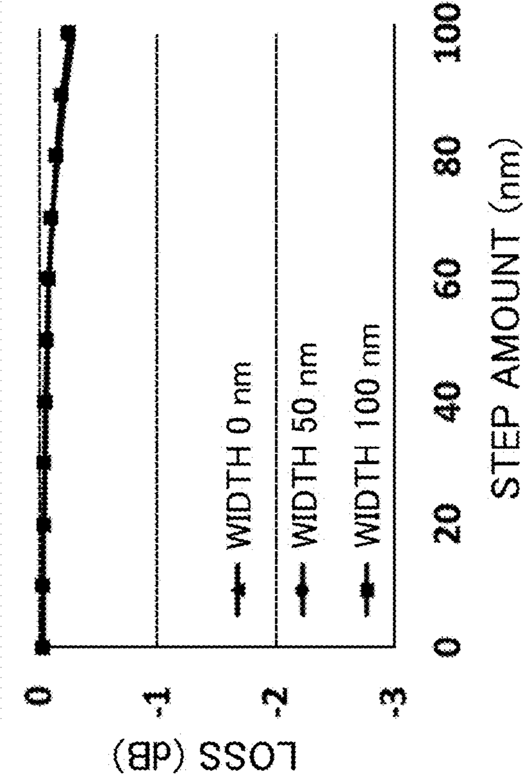
Figure 8B:
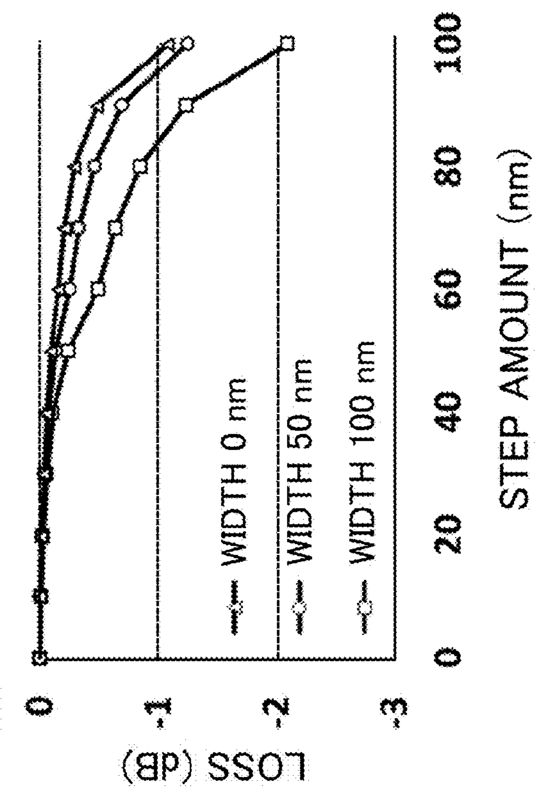

Further, FIGS. 8A and 8B depicts results when the loss where the length of the second region 1B of the waveguide core 1, namely, the length of the thick film regions 1Y, was set to approximately 50 μm and the minimum width of the thick film regions 1Y of the second region 1B was set to 0 nm, 50 nm and 100 nm and besides the step amount, namely, the thickness difference (step difference) between the thick film regions 1Y and thin film region 1Z of the second region 1B, was varied was calculated.

Here, FIG. 8A depicts results when the loss of TE polarization is calculated, and a result in the case in which the minimum width of the thick film regions 1Y of the second region 1B is 0 nm is indicated by plotting a triangle mark; a result in the case in which the minimum width is 50 nm is indicated by plotting a circle mark; and a result in the case in which the minimum width is 100 nm is indicated by plotting a square mark. Further, FIG. 8B depicts results when the loss of TM polarization is calculated, and a result in the case in which the minimum width of the thick film regions 1Y of the second region 1B is 0 nm is indicated by plotting a triangle mark; a result in the case in which the minimum width is 50 nm is indicated by plotting a circle mark; and a result in the case in which the minimum width is 100 nm is indicated by plotting a square mark.

It is recognized that, if the minimum width of the thick film regions 1Y of the second region 1B is set to 50 nm or less and the step amount, namely, the thickness difference between the thick film regions 1Y and thin film region 1Z of the second region 1B, is set 80 nm or less as depicted in FIGS. 8A and 8B, then suppression of loss to a low level and a low polarization dependency can be implemented.

In this manner, it is preferable to configure the thick film regions 1Y of the second region 1B such that the width (tip end width; minimum width) of an end portion (tip end portion; terminal end portion) thereof at the side of the third region 1C is 50 nm or less and the thickness difference between the thick film regions 1Y and the thin film region 1Z of the second region 1B is 80 nm or less. In this case, the first region 1A and the third region 1C have a thickness difference of 80 nm or less therebetween.

For example, where the tip end width of the thick film regions 1Y of the second region 1B is set to 50 nm and the step amount is set to 70 nm, the loss of TE polarization is 0.1 dB and the loss of TM polarization is 0.3 dB. In comparison with the comparative examples 1 and 2 described above, the loss of TM polarization can be suppressed and, as a result, suppression of loss to a low level and a low polarization dependency can be implemented.

The embodiment of the present technology is described below with reference to a particular example.

As depicted in FIGS. 1A to 1D, the present optical waveguide includes an $SiO_2$ lower cladding layer 2 provided on a silicon substrate not depicted, a silicon waveguide core 1 provided on the $SiO_2$ lower cladding layer 2 and an $SiO_2$ upper cladding layer 3 that covers the silicon waveguide core 1. It is to be noted that the $SiO_2$ upper cladding layer 3 is not depicted in FIG. 1A.

The silicon waveguide core 1 includes the first region 1A, the second region 1B having the step 1X at which the thickness varies, and the third region 1C having a thickness smaller than that of the first region 1A. Further, the second region 1B has the thick film regions 1Y that are positioned at both sides in a widthwise direction in a continuing relationship to the first region 1A and have a thickness equal to that of the first region 1A and a width gradually reducing from the side of the first region 1A to the side of the third region 1C and the thin film region 1Z that is sandwiched by the thick film regions 1Y and continues to the third region 1C and besides has a thickness equal to that of the third region 1C.

Here, the thickness of the $SiO_2$ lower cladding layer 2 is, for example, approximately 3 μm, and the refractive index is approximately 1.44.

In the silicon waveguide core 1, the width in an overall range from the first region 1A to the third region 1C is, for example, approximately 500 nm and the thickness of the first region 1A and the thick film regions 1Y of the second region 1B is, for example, approximately 220 nm and besides the thickness of the thin film region 1Z of the second region 1B and the third region 1C is, for example, approximately 150 nm, and the silicon waveguide core 1 configures a single-mode waveguide. Further, the length of the second region 1B of the silicon waveguide core 1, namely, the length of the thick film regions 1Y, is, for example, approximately 15 μm. Further, the width of each of the thick film regions 1Y positioned at both sides in the widthwise direction is, for example, approximately 150 nm at the side of the first region 1A but is, for example, approximately 50 nm at the side of the third region 1C, and the thick film regions 1Y have a taper shape in which the width gradually reduces from the side of the first region 1A to the side of the third region 1C. It is to be noted that the refractive index of the silicon waveguide core 1 is approximately 3.48.

The thickness of the $SiO_2$ upper cladding layer 3 is, for example, approximately 1 μm above the silicon waveguide core 1 but is, for example, approximately 2 μm at the remaining portion, and the refractive index is approximately 1.44. It is to be noted that the $SiO_2$ upper cladding layer 3 may not be provided.

In the particular example, the loss of TE polarization in the second region 1B of the silicon waveguide core 1 having the step 1X was approximately 0.1 dB and the loss of TM polarization was approximately 0.3 dB. In this manner, the loss of TM polarization can be reduced, and suppression of loss to a low level and a low polarization dependency can be implemented.

An optical waveguide having such a configuration of the particular example as described above can be fabricated, for example, in the following manner using, for example, an SOI (silicon on insulator) substrate. It is to be noted that the SOI substrate is referred to sometimes as SOI wafer substrate.

Figure 9A:
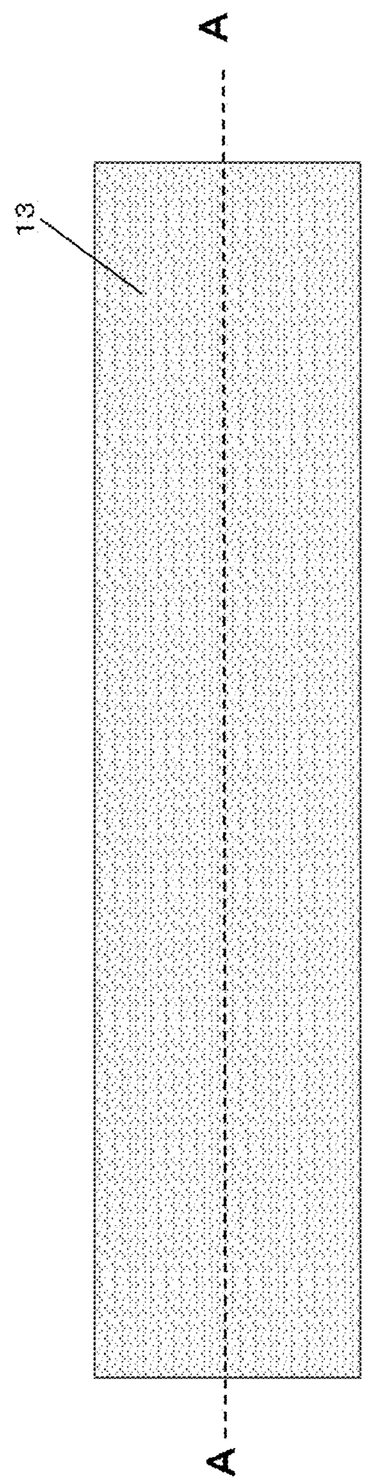
Figure 9B:
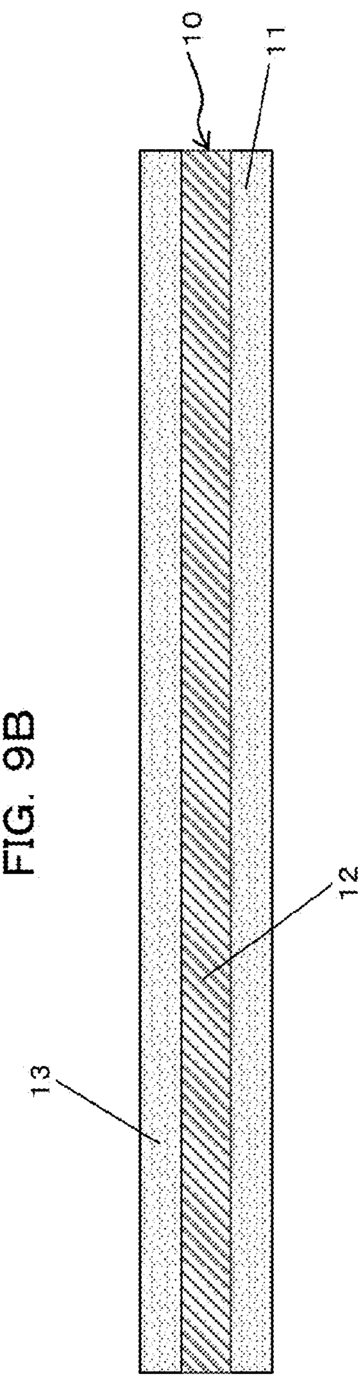

First, as depicted in FIGS. 9A and 9B, an $SiO_2$ film 13 (for example, of a thickness of approximately 50 nm) is deposited on an SOI substrate 10 (wherein the thickness of the BOX layer 11 that is an $SiO_2$ layer is approximately 3 μm and the thickness of the SOI layer 12 that is a silicon layer is approximately 220 nm) by a CVD method. Here, $SiH_4$ (20%)/He and $N_2O$ may be used as the material gas.

Figure 10A:
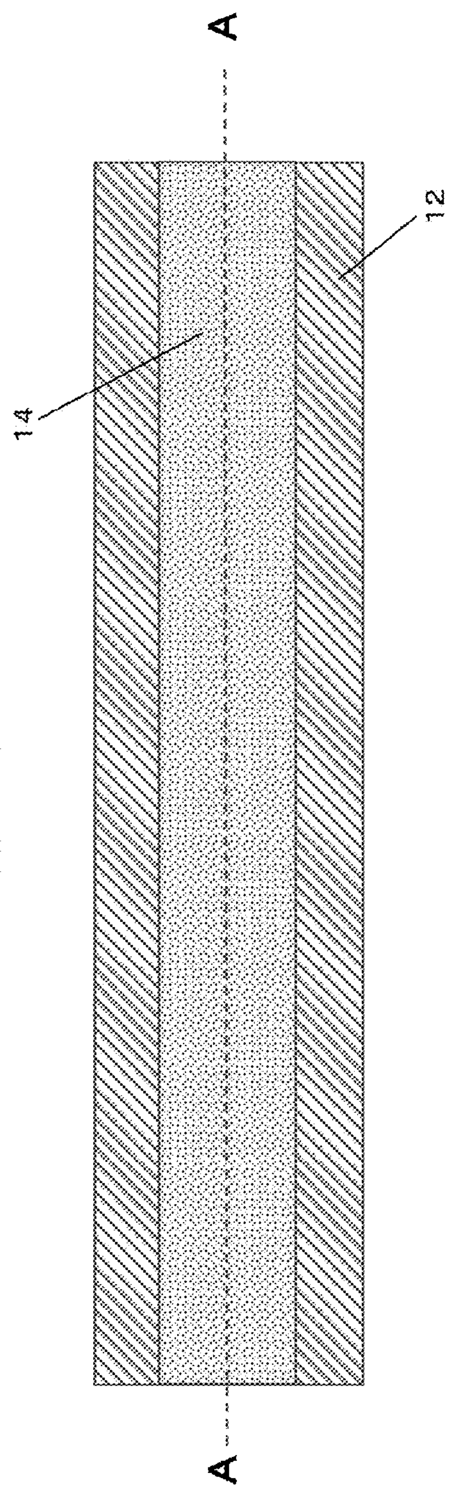
Figure 10B:
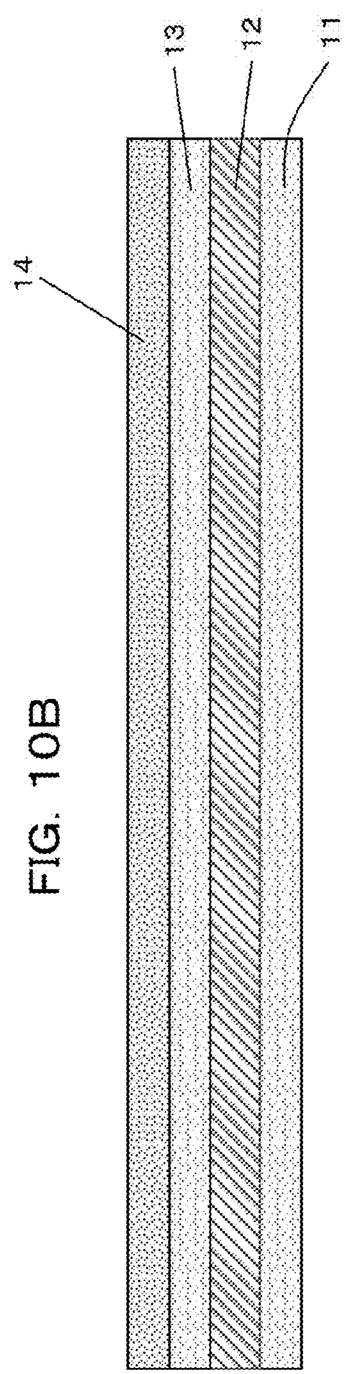
Figure 11A:
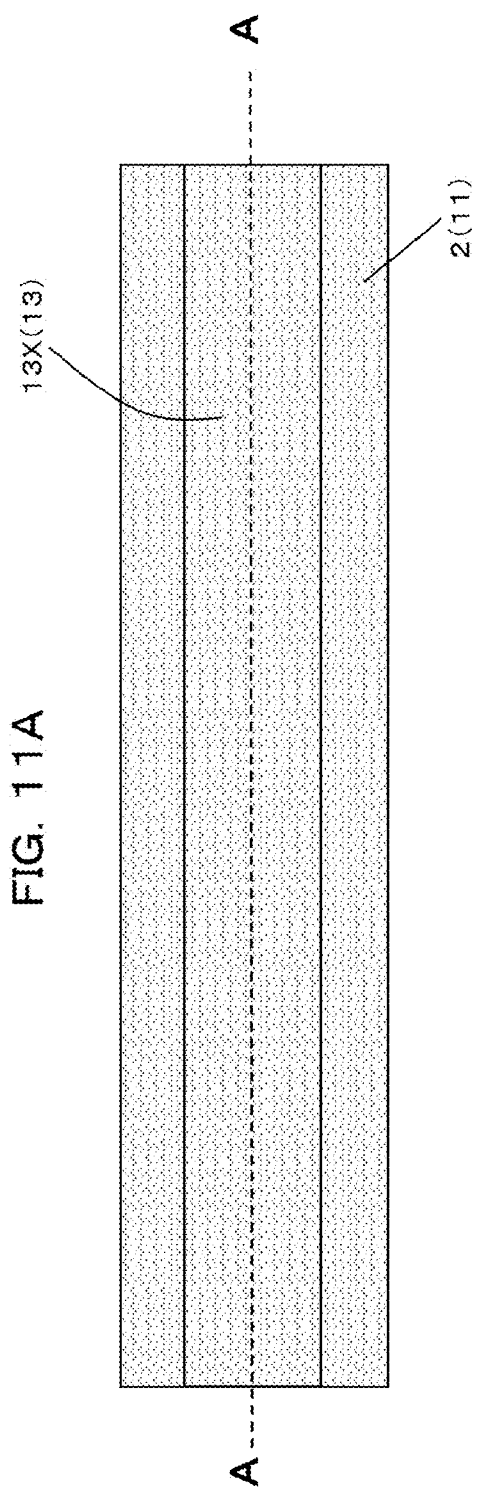
Figure 11B:
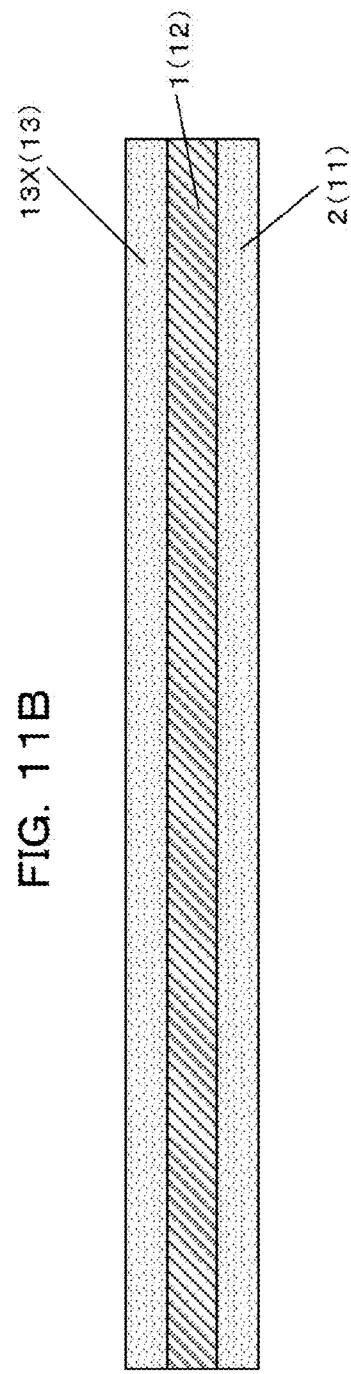

Then, as depicted in FIGS. 10A and 10B, a photo resist pattern 14 is formed on the $SiO_2$ film 13 and the $SiO_2$ film 13 is etched by RIE using $CF_4$ gas. Then, as depicted in FIGS. 11A and 11B, the SOI layer 12 is processed to form a hard mask pattern 13X for forming the silicon waveguide core 1 and then the photo resist pattern 14 is removed.

Then, using the hard mask pattern 13X, the SOI layer 12 that is a silicon layer is etched by RIE using HBr gas. Consequently, the silicon waveguide core 1 is formed. Further, the BOX layer 11 is exposed from both sides of the silicon waveguide core 1 and functions as the $SiO_2$ lower cladding layer 2.

Thereafter, as depicted in FIGS. 12A and 12B, a photo resist pattern 15 is formed on the hard mask pattern 13X and the hard mask pattern 13X is etched by RIE using $CF_4$ gas. Then, as depicted in FIGS. 13A and 13B, the SOI layer 12 is processed to form a hard mask pattern 13Y for reducing the thickness of the thin film region 1Z of the second region 1B and the third region 1C of the silicon waveguide core 1.

Figure 13A:
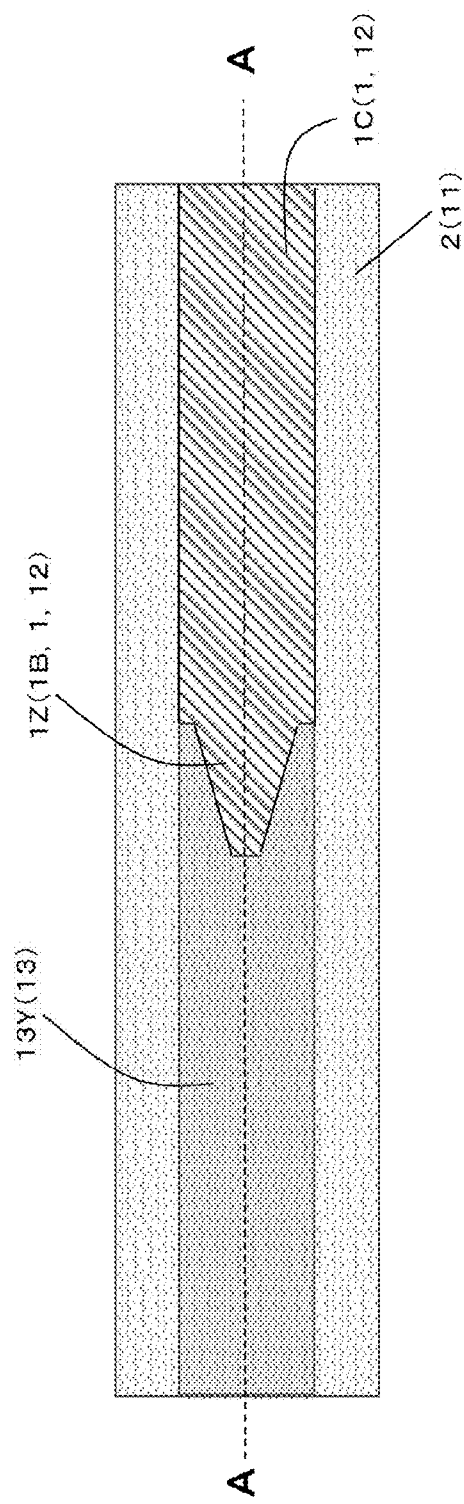
Figure 13B:
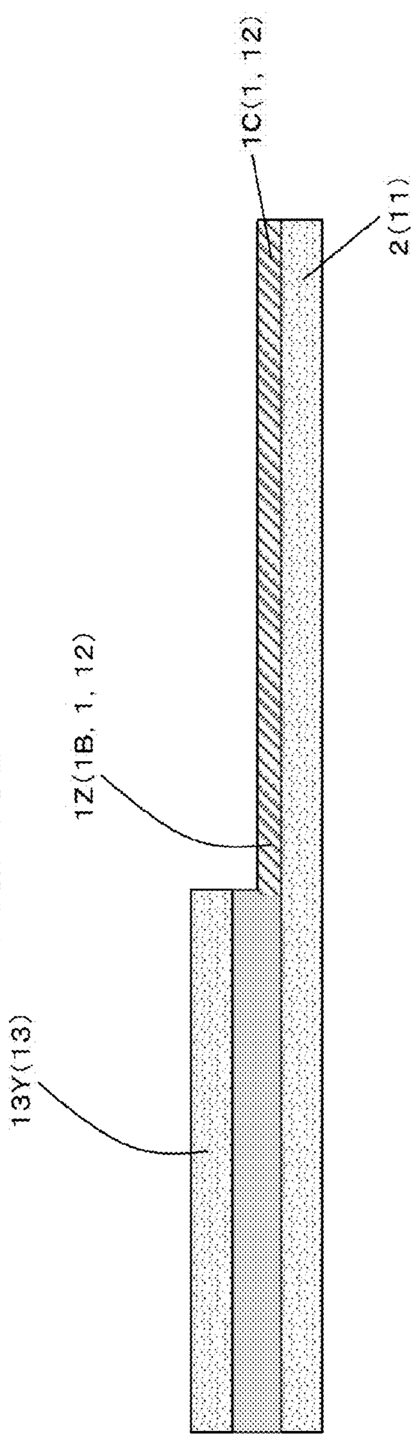

Then, after the photo resist pattern 15 is removed, as depicted in FIGS. 13A and 13B, the SOI layer 12 that is a silicon layer is etched by approximately 70 nm using HBr gas to set the thickness to approximately 150 nm. Consequently, the thin film region 1Z of the second region 1B and the third region 1C of the silicon waveguide core 1 are formed. It is to be noted that, in FIG. 13A, the silicon waveguide core 1 is depicted so as to be viewable. Further, in FIG. 13B, patterns different from each other are applied to a thin region and a thick region of the silicon waveguide core 1 so as to correspond to FIG. 1.

Figure 14A:
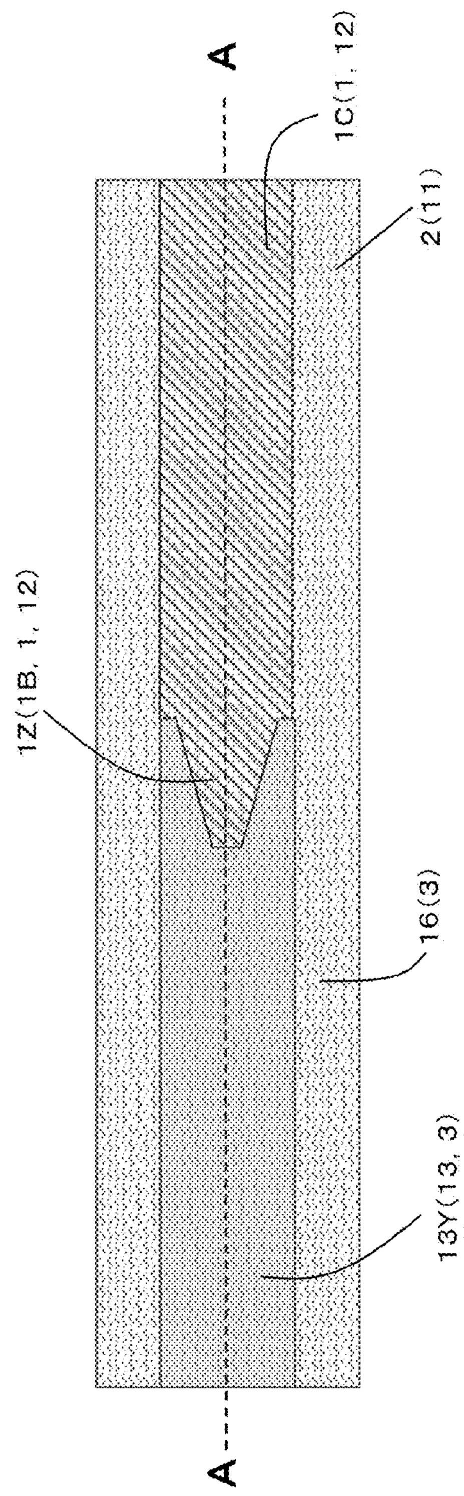
Figure 14B:
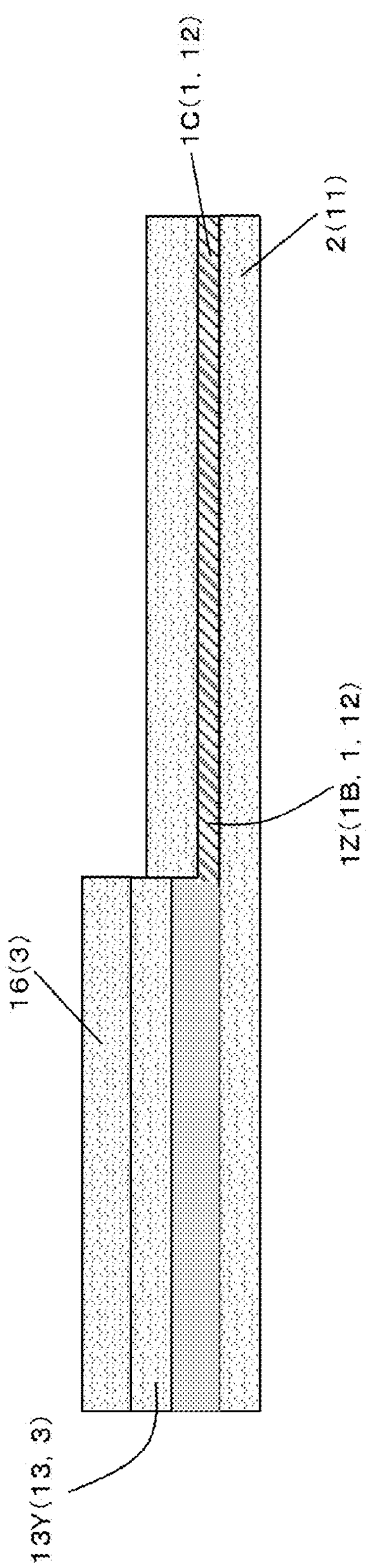

Then, as depicted in FIGS. 14A and 14B, an $SiO_2$ film 16 (for example, of a thickness of approximately 1 μm) is deposited by a CVD method so as to cover the silicon waveguide core 1 to form the $SiO_2$ upper cladding layer 3 formed from the $SiO_2$ film 13 and the $SiO_2$ film 16. Consequently, the optical waveguide including the configuration of the particular example described above is fabricated. It is to be noted that, in FIG. 14A, the silicon waveguide core 1 is depicted so as to be viewable. Further, in FIG. 14B, patterns different from each other are applied to a thin region and a thick region of the silicon waveguide core 1 so as to correspond to FIG. 1.

Accordingly, the present optical waveguide is advantageous in that the region 1B having the step 1X, at which the thickness varies, of the waveguide core 1 can be fabricated easily, and suppression of loss to a low level and a low polarization dependency can be implemented.

It is to be noted that, while, in the embodiment described above, the thick film regions 1Y of the second region 1B have a width gradually reducing in a taper shape from the side of the first region 1A to the side of the third region 1C and the thin film region 1Z of the second region 1B has a width gradually increasing in a taper shape from the side of the first region 1A to the side of the third region 1C, the embodiment is not limited to this.

Figure 15:
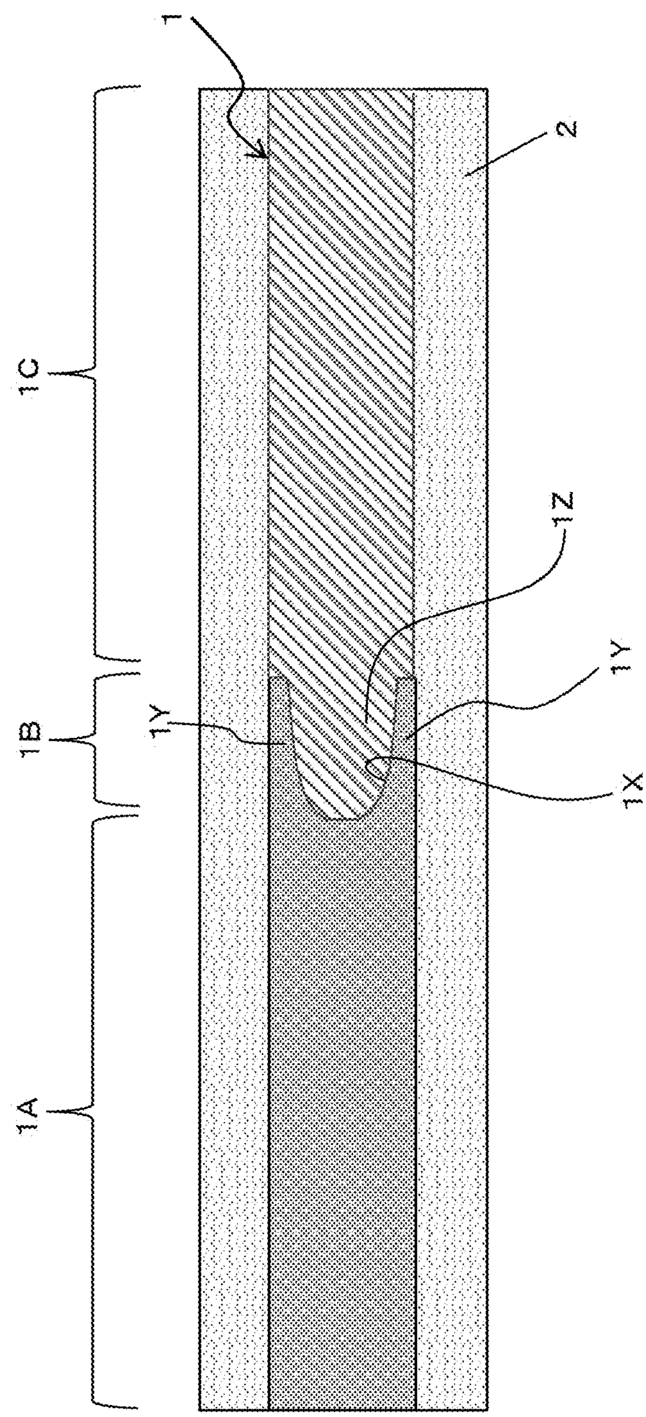
FIGS. 15 to 17 are schematic top plan views depicting a configuration of optical waveguides according to modifications to the first embodiment.

For example, as depicted in FIG. 15, the thick film regions 1Y of the second region 1B may have a width gradually reducing in a curved shape from the side of the first region 1A to the side of the third region 1C and the thin film region 1Z of the second region 1B may have a width gradually increasing in a curved shape from the side of the first region 1A to the side of the third region 1C. It is to be noted that the upper cladding layer 3 is not depicted in FIG. 15. Further, in FIG. 15, patterns different from each other are applied to a thin region and a thick region of the silicon waveguide core 1.

Figure 16:
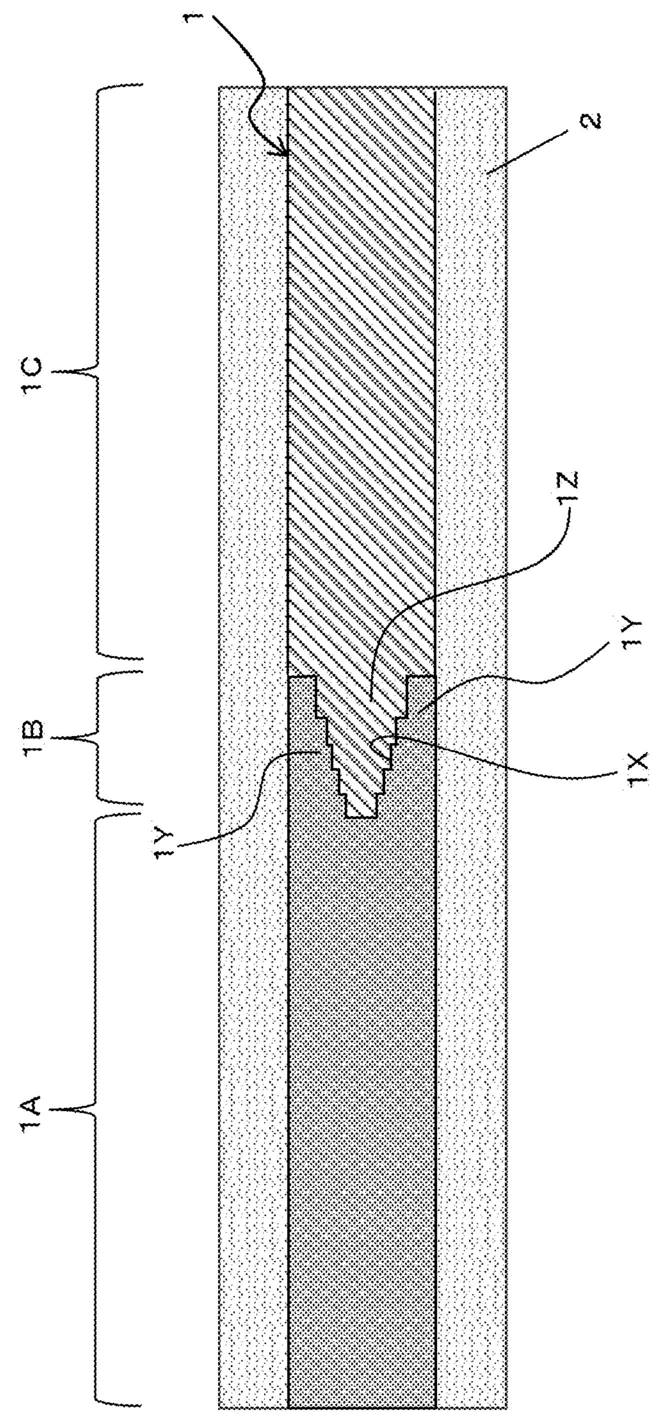

Or, for example, as depicted in FIG. 16, the thick film regions 1Y of the second region 1B may have a width gradually reducing stepwise from the side of the first region 1A to the side of the third region 1C and the thin film region 1Z of the second region 1B may have a width gradually increasing stepwise from the side of the first region 1A to the side of the third region 1C. It is to be noted that the upper cladding layer 3 is not depicted in FIG. 16. Further, in FIG. 16, patterns different from each other are applied to a thin region and a thick region of the silicon waveguide core 1.

In this manner, the thick film regions 1Y of the second region 1B may be formed such that the width thereof gradually reduces in a taper shape, in a curved shape, stepwise or in a shape of a combination of the shapes from the side of the first region 1A to the side of the third region 1C. In other words, the thin film region 1Z of the second region 1B may be formed such that the width thereof gradually increases in a taper shape, in a curved shape, stepwise or in a shape of a combination of the shapes from the side of the first region 1A to the side of the third region 1C.

Figure 17:
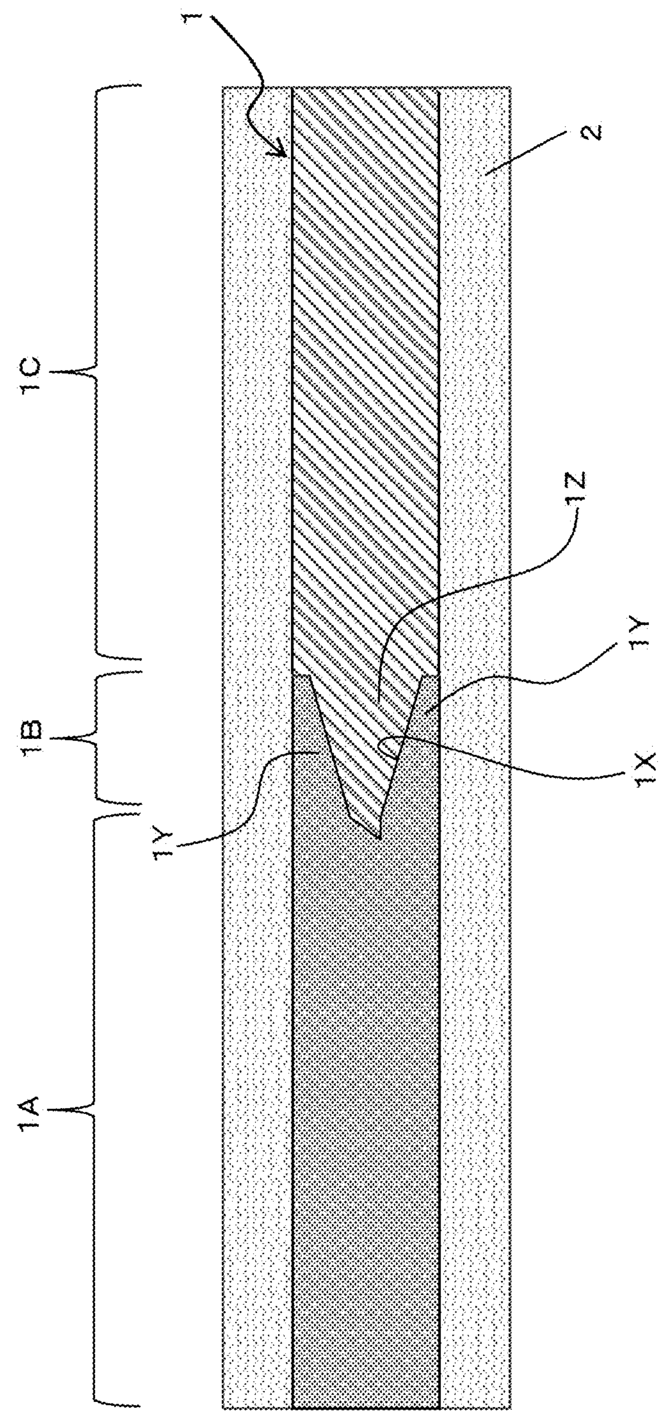

Further, while, in the embodiment and the modifications described above, the end portion (tip end portion) of the first region 1A side of the thin film region 1Z of the second region 1B of the waveguide core 1 has an end face orthogonal to a direction (light propagation direction) in which the thin film region 1Z extends, the end portion is not limited to this. For example, as depicted in FIG. 17, the end portion may have an end face oblique with respect to a direction orthogonal to the direction (light propagation direction) in which the thin film region 1Z extends. In other words, the end portion (tip end portion; terminal end portion) of the first region 1A side of the thin film region 1Z of the second region 1B of the waveguide core 1 maybe configured obliquely to a direction orthogonal to the direction (light propagation direction) in which the thin film region 1Z extends. It is to be noted that the upper cladding layer 3 is not depicted in FIG. 17. Further, in FIG. 17, patterns different from each other are applied to a thin region and a thick region of the silicon waveguide core 1.

Further, while, in the embodiment and the modifications described above, the position of the center of the thin film region 1Z of the second region 1B of the waveguide core 1 coincides with the position of the center of the second region 1B, the positions of the centers are not limited to them. The positions of the centers may be displaced from each other, for example, by displacement in mask alignment upon fabrication or the like, and, also in this case, although the loss increases a little, effects similar to those achieved by the embodiment and the modifications are achieved.

Further, while the waveguide core 1 in the embodiment and the modifications described above is formed in a channel waveguide shape, the waveguide core is not limited to this. For example, the waveguide core 1 may be formed in a rib waveguide shape, and, also in this case, effects similar to those achieved by the embodiment and the modification can be achieved.

Second Embodiment

Now, a spot size converter and an optical apparatus according to the present embodiment are described with reference to FIGS. 18A to 29.

The spot size converter according to the present embodiment is a second core type spot size converter in which the width of a silicon waveguide core reduces in a taper shape and the silicon waveguide core is covered with a second core and besides a spot size is enlarged by causing light to transit from the silicon waveguide core to the second core. In such a second core type spot size converter as just described, light gradually transits from the silicon waveguide core to the second core in the region in which the width of the silicon waveguide core reduces in a taper shape and the light fully transits to the second core finally, and, as a result, the spot size is enlarged. Such a spot size converter as just described is provided, for example, in a silicon optical device formed on a silicon substrate.

It is to be noted that the spot size is referred to sometimes as spot diameter, mode field size, mode size, mode field diameter or mode diameter. Further, the silicon optical device is referred to sometimes as optical semiconductor device. Further, the spot size converter is referred to sometimes as optical spot size converter.

Particularly, in the spot size converter of the present embodiment, the structure of the waveguide core 1 in the first embodiment and the modifications described hereinabove is applied to the silicon waveguide core.

Figures 18A, 18B, 18C, 18D, 18E, 18F:
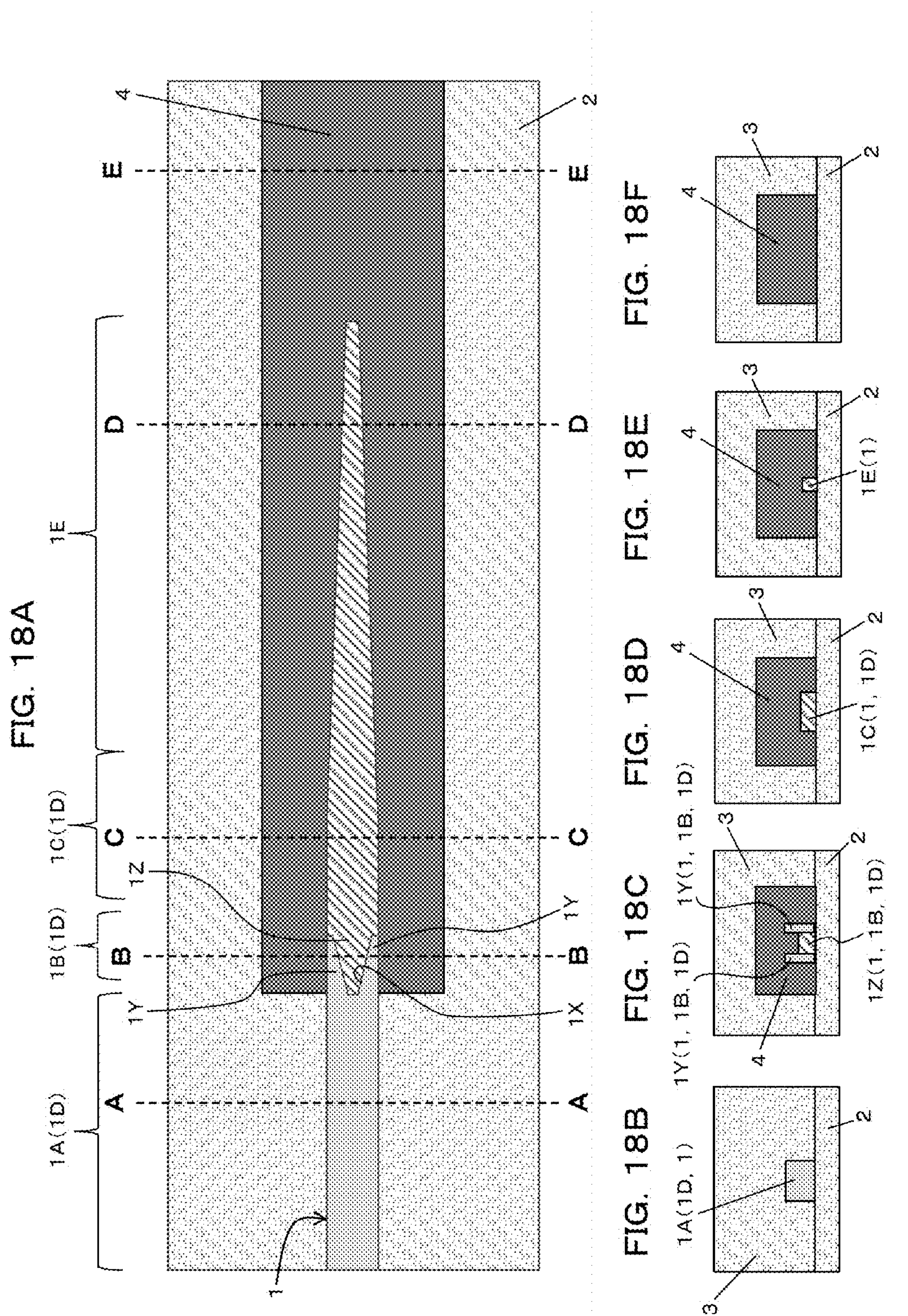

In the present embodiment, as depicted in FIGS. 18A to 18F, the spot size converter includes the silicon waveguide core 1 (first silicon waveguide core) and a second core 4 (second waveguide core). It is to be noted that the upper cladding layer 3 is not depicted in FIG. 18A. Further, for the convenience of illustration, it is depicted in FIG. 18A such that the silicon waveguide core 1 buried in the second core 4 is exposed. Further, as depicted in FIGS. 18A to 18F, patterns different from each other are applied to a thin region and a thick region of the silicon waveguide core 1.

Here, the silicon waveguide core 1 includes the first region 1A, the second region 1B including the step 1X at which the thickness varies, and the third region 1C having a thickness smaller than that of the first region 1A. The silicon waveguide core 1 further includes a fixed width region 1D having a fixed width, and a width taper region 1E continuing to the fixed width region 1D and having a width reducing toward a terminal end portion (tip end portion). Here, the width taper region 1E is a region having a width reducing toward a direction in which the spot size is enlarged. Further, the width taper region 1E is a region having a width taper structure. Further, the width taper region 1E has a fixed thickness.

It is to be noted that the width taper region 1E is referred to sometimes as fourth silicon core. The fourth silicon core 1E is connected to an end portion of one side of the third silicon core 1C.

The second region 1B of the fixed width region 1D has the thick film regions 1Y that are positioned at both sides in the widthwise direction in a continuing relationship with the first region 1A and have a thickness equal to that of the first region 1A and besides have a width gradually reducing from the side of the first region 1A to the side of the third region 1C, and the thin film region 1Z that is sandwiched by the thick film regions 1Y and continues to the third region 1C and besides has a thickness equal to that of the third region 1C.

In the present embodiment, the silicon waveguide core 1 has a fixed width. In particular, the first region 1A, second region 1B and third region 1C configuring the silicon waveguide core 1 have widths equal to one another. The thick film regions 1Y of the second region 1B have a width gradually reducing in a taper shape from the side of the first region 1A to the side of the third region 1C. Therefore, the thin film region 1Z of the second region 1B has a width gradually increasing in a taper shape from the side of the first region 1A to the side of the third region 1C.

It is to be noted that thick film regions 1Y are not limited to this, and the thick film regions 1Y of the second region 1B may have a width gradually reducing in a taper shape, in a curved shape, stepwise or in a shape of a combination of the shapes from the side of the first region 1A to the side of the third region 1C. That is, the thin film region 1Z of the second region 1B has a width gradually increasing in a taper shape, in a curved shape, stepwise or in a shape of a combination of the shapes from the side of the first region 1A to the side of the third region 1C. Further, an end portion (tip end portion; terminal end portion) of the first region 1A side of the thin film region 1Z of the second region 1B may be configured obliquely to a direction orthogonal to a direction in which the thin film region 1Z extends.

Further, the silicon waveguide core 1 is configured so as to satisfy a single-mode condition. In particular, the dimensions of the silicon waveguide core 1, namely, the dimensions of the first region 1A, second region 1B and third region 1C configuring the silicon waveguide core 1, are set such that light propagating in the core forms a single mode. Therefore, the optical waveguide including the silicon waveguide core 1 is a single-mode optical waveguide.

Particularly, it is preferable to configure the thick film regions 1Y of the second region 1B so as to have a length of 5 μm or more.

Further, it is preferable to configure the thick film regions 1Y of the second region 1B such that the width (tip end width) of an end portion (tip end portion; terminal end portion) of the side of the third region 1C is 50 nm or less and the thick film regions 1Y and thin film region 1Z of the second region 1B have a thickness difference (step difference) of 80 nm or less therebetween. In this case, the first region 1A and the third region 1C have a thickness difference of 80 nm or less therebetween.

Further, the second core 4 covers at least the width taper region 1E and continues to the silicon waveguide core 1. Here, the second core 4 covers not only the width taper region 1E but also the second region 1B and third region 1C of the fixed width region 1D. It is to be noted that the second core 4 may cover also the first region 1A of the fixed width region 1D. Further, the sectional size of the second core 4 is fixed over the overall length thereof.

Since the structure of the waveguide core of the first embodiment and the modifications described above is applied to the silicon waveguide core 1 in the spot size converter of the present embodiment as described hereinabove, the loss of TM polarization can be suppressed and, as a result, suppression of loss to a low level and a low polarization dependency can be implemented. For example, in the spot size converter (refer to FIGS. 19A to 19F) to which the structure of the waveguide core of the comparative example 2 with the first embodiment described above is applied and in which a second core 102 is provided, the conversion loss of TE polarization and TM polarization is approximately 0.9 dB and approximately 2.3 dB, respectively. On the other hand, in the spot size converter of the present embodiment to which the structure of the waveguide core of the first embodiment and the modifications described hereinabove is applied, the conversion loss of TE polarization and TM polarization is approximately 0.9 dB and approximately 1.3 dB, respectively. Therefore, the loss of TM polarization can be reduced and suppression of loss to a low level (achievement of a high efficiency) and a low polarization dependency can be implemented. It is to be noted that the upper cladding layer is not depicted in FIG. 19A. Further, for the convenience of illustration, it is depicted in FIG. 19A that the silicon waveguide core 101 buried in the second core 102 is exposed.

Incidentally, such a configuration as described above is applied from a reason described below.

First, in a conventional second core type spot size converter, the spot size cannot be sufficiently enlarged. For example, while the spot size can be enlarged to a spot size of a small-diameter core fiber (for example, to approximately 4 μm), the spot size cannot be enlarged to a spot size of a dispersion shifted fiber (DSF) (for example, to approximately 8 μm) or another spot size of a single-mode fiber (SMF) (for example, to approximately 10.5 μm). Therefore, although low loss coupling with a small-diameter core fiber can be implemented, low loss coupling with a dispersion shift fiber or a single-mode fiber cannot be implemented. It is to be noted that, if the spot size can be sufficiently enlarged and low loss coupling with a dispersion shift fiber or a single-mode fiber can be implemented by the spot size converter, then a dispersion shift fiber or a single-mode fiber that are less expensive than a small-diameter core fiber can be used and reduction of the cost can be implemented thereby. Further, by enlargement of the spot size, the positional displacement tolerance with respect to a fiber is enlarged and this facilitates joining of the second core type spot size converter with the fiber.

In this case, in order to implement low loss coupling with a dispersion shift fiber or a single-mode fiber, for example, it seems a possible idea to enlarge the size of the second core and reduce the refractive index of the second core to enlarge the spot size.

However, if the size of the second core is increased simply and the refractive index of the second core is decreased simply in order to enlarge the spot size, then the loss when light transits from the silicon waveguide core to the second core increases. Therefore, it is difficult to implement low loss coupling with a dispersion shift fiber or a single-mode fiber.

The reason why, where the size of the second core is increased and the refractive index of the second core is decreased, the loss when light transits from the silicon waveguide core to the second core increases in this manner is that the loss of TM polarization increases. In this case, also the polarization dependency increases. In other words, where the size of the second core is increased and the refractive index of the second core is decreased, increase of the loss of TM polarization is significant and the polarization dependency increases. It is considered that the reason why increase of the loss of TM polarization is significant in this manner is that, since the thickness (film thickness) of the silicon waveguide core is fixed, TM polarization is less likely to transit to the second core.

In this case, in order to promote transition of TM polarization to the second core, it seems a possible idea to reduce the width of the silicon waveguide core in a taper shape and reduce also the thickness of the silicon waveguide core in a taper shape similarly to the width; to reduce the width of a terminal end portion of the silicon waveguide core, namely, the width of a tip end portion of the width taper region as small as possible; or to combine the ideas just described.

However, reduction of the thickness of the silicon waveguide core in a taper shape is high in difficulty in a process. Further, even if it is intended to reduce the width of a tip end portion of the width taper region of the silicon waveguide core as small as possible, there is a restriction to the reduction and it is difficult to fabricate the silicon waveguide core with high accuracy.

Thus, it seems a possible idea to reduce the width of the silicon waveguide core in a taper shape and reduce the thickness stepwise in the region in which the width is reduced in a taper shape so that the silicon waveguide core can be fabricated readily.

However, if the thickness is reduced stepwise to produce a step in the region in which the width of the silicon waveguide core is reduced in a taper shape, light suddenly transits at the step and the loss increases. In particular, it has been recognized that, even if the thickness is reduced stepwise in the region in which the width of the silicon waveguide core is reduced in a taper shape, the loss of TM polarization cannot be suppressed and it is difficult to implement low polarization dependency. In this manner, it has been recognized that, even if the thickness is reduced stepwise in the region in which the width of the silicon waveguide core is reduced in a taper shape, the loss when light transits from the silicon waveguide core to the second core cannot be suppressed and it is difficult to implement low loss coupling with a dispersion shift fiber or a single mode fiber.

Therefore, in the present embodiment, the step structure of the first embodiment and the modifications described above is applied as a step structure to be provided in the silicon waveguide core 1 as described above. In particular, in the present embodiment, the region 1B including the step 1X of the silicon waveguide core 1 at which the thickness varies, namely, the second region 1B that is a region in which the step 1X exists at the boundary between the thick film regions 1Y and the thin film region 1Z, is provided in a region other than the width taper region 1E of the silicon waveguide core 1, namely, in the fixed width region 1D. Further, the second region 1B includes the thick film regions 1Y positioned at both sides in the widthwise direction in a continuing relationship to the first region 1A and having a thickness equal to that of the first region 1A and besides having a width gradually reducing from the side of the first region 1A to the side of the third region 1C, and the thin film region 1Z sandwiched by the thick film regions 1Y and continuing to the third region 1C and besides having a thickness equal to that of the third region 1C. In this manner, by reducing the thickness stepwise in the fixed width region 1D continuing to the width taper region 1E of the silicon waveguide core 1, the thickness of the width taper region 1E is reduced and the thickness of the tip end portion of the width taper region 1E is reduced.

In this manner, by providing the step 1X in the thicknesswise direction in a region in which light does not transit or another region in which the transition amount of light is small between the silicon waveguide core 1 and the second core 4, sudden transition of light at the step location can be reduced and increase of the loss can be suppressed. Further, by applying the step structure of the first embodiment and the modifications described above, the loss of TM polarization can be suppressed and suppression of loss to a low level and a low polarization dependency can be implemented. Consequently, the second core type spot size converter having low loss and low polarization dependency can be implemented. In short, in the second core type spot size converter, the loss of TM polarization can be suppressed and low polarization dependency can be implemented. Therefore, where the size of the second core 4 is increased and the refractive index of the second core 4 is reduced in order to enlarge a spot size so as to allow coupling with a less expensive dispersion shift fiber or single mode fiber with a high efficiency, the loss when light transits from the silicon waveguide core 1 to the second core 4 can be suppressed low. As a result, reduction of loss (increase in efficiency) in coupling with a dispersion shift fiber or a single mode fiber and low polarization dependency can be implemented, and reduction of the cost can be implemented.

In the following, description is given of a particular example.

As depicted in FIGS. 18A to 18F, the present spot size converter includes an $SiO_2$ lower cladding layer 2 provided on a silicon substrate not depicted, a silicon waveguide core 1 provided on the $SiO_2$ lower cladding layer 2, a second core 4 that partially covers the silicon waveguide core 1, and an $SiO_2$ upper cladding layer 3 that covers the silicon waveguide core 1 and the second core 4.

The silicon waveguide core 1 includes a fixed width region 1D in which the width does not vary and a width taper region 1E. Further, the fixed width region 1D has a first region 1A, a second region 1B having a step 1X at which the thickness varied, and a third region 1C having a thickness smaller than that of the first region 1A. Further, the second region 1B includes thick film regions 1Y positioned at both sides in the widthwise direction in a continuing relationship to the first region 1A and having a thickness equal to that of the first region 1A and besides having a width gradually reducing from the side of the first region 1A to the side of the third region 1C, and a thin film region 1Z sandwiched by the thick film regions 1Y and continuing to the third region 1C and besides having a thickness equal to that of the third region 1C.

Here, the second core 4 covers not only the width taper region 1E but also the second region 1B and the third region 1C of the fixed width region 1D and continues to the silicon waveguide core 1.

Here, the thickness of the $SiO_2$ lower cladding layer 2 is, for example, approximately 3 μm and the refractive index is approximately 1.44.

In the silicon waveguide core 1, the width in the fixed width region 1D is, for example, approximately 500 nm and the width in the width taper region 1E is reduced in a taper shape toward a tip end portion from approximately 500 nm to approximately 180 nm, and the silicon waveguide core 1 configures a single mode waveguide. Further, in the silicon waveguide core 1, the thickness of the thick film regions 1Y of the first region 1A and the second region 1B of the fixed width region 1D, for example, approximately 150 nm and the thickness of the thin film region 1Z of the second region 1B and the third region 1C is, for example, approximately 90 nm. Further, in the silicon waveguide core 1, the thickness of the width taper region 1E is, for example, approximately 90 nm and the step 1X having a thickness of approximately 60 nm is provided at a boundary between the thick film regions 1Y and the thin film region 1Z of the second region 1B. Further, the length of the second region 1B of the silicon waveguide core 1, namely, the length of the thick film regions 1Y, is, for example, approximately 15 μm. Further, the width of the thick film regions 1Y positioned at both sides in the widthwise direction is, for example, approximately 150 nm at the side of the first region 1A but is, for example, approximately 50 nm at the side of the third region 1C, and is formed in a taper shape having a width gradually reducing from the side of the first region 1A to the side of the third region 1C. It is to be noted that the refractive index of the silicon waveguide core 1 is approximately 3.48.

The second core 4 is an $SiO_X$ waveguide core (silicon compound waveguide core) for which $SiO_X$ (silicon oxide; silicon compound) is used as a material, and, for example, the thickness, width and refractive index of the second core 4 are approximately 3 μm, approximately 7 μm and approximately 1.48, respectively. In this manner, the second core 4 has a refractive index lower than that of the silicon waveguide core 1 but higher than that of the $SiO_2$ upper cladding layer 3 and has a sectional size greater than that of the silicon waveguide core 1, and configures a single mode waveguide.

The thickness of the $SiO_2$ upper cladding layer 3 at the portion above the second core 4 is, for example, approximately 1 μm and the thickness at the remaining portion is, for example, approximately 2 μm, and the refractive index is approximately 1.44. It is to be noted that the $SiO_2$ upper cladding layer 3 may not be provided.

In the particular example, the conversion loss of TE polarization is approximately 0.9 dB and the conversion loss of TM polarization is approximately 1.3 dB, and the loss of TM polarization can be suppressed and suppression of loss to a low level (increase of the efficiency) and a low polarization dependency can be implemented. Further, since the thickness (height) and the width of the second core 4 are set to approximately 3 μm and approximately 7 μm in order to increase the size of the second core 4, respectively, and the refractive index of the second core 4 is set to approximately 1.48 in order to decrease the refractive index of the second core 4 so as to satisfy the single mode condition, the spot size is enlarged to a size with which coupling with a dispersion shift fiber or a single mode fiber is implemented with a high efficiency. Further, the step 1X having a thickness of approximately 60 nm is provided in the second region 1B of the fixed width region 1D of the silicon waveguide core 1 and the thickness of the width taper region 1E of the silicon waveguide core 1 is set to approximately 90 nm so that the loss when light transits from the silicon waveguide core 1 to the second core 4 is suppressed low. Consequently, reduction of loss (increase in efficiency) in coupling with a dispersion shift fiber or a single mode fiber and low polarization dependency are implemented. Further, since the spot size is enlarged by uniformly increasing the sectional size of the second core 4 over the overall length of the second core 4, compactification can be achieved in comparison with, for example, that in the case in which the length of the second core 4 is increased and the sectional size is increased stepwise or in a taper shape to enlarge the spot size.

A device having such a configuration of the particular example as described above can be produced, for example, in such a manner as described below using, for example, an SOI (silicon on insulator) substrate. It is to be noted that an SOI substrate is referred to sometimes as SOI wafer substrate.

Figure 20A:
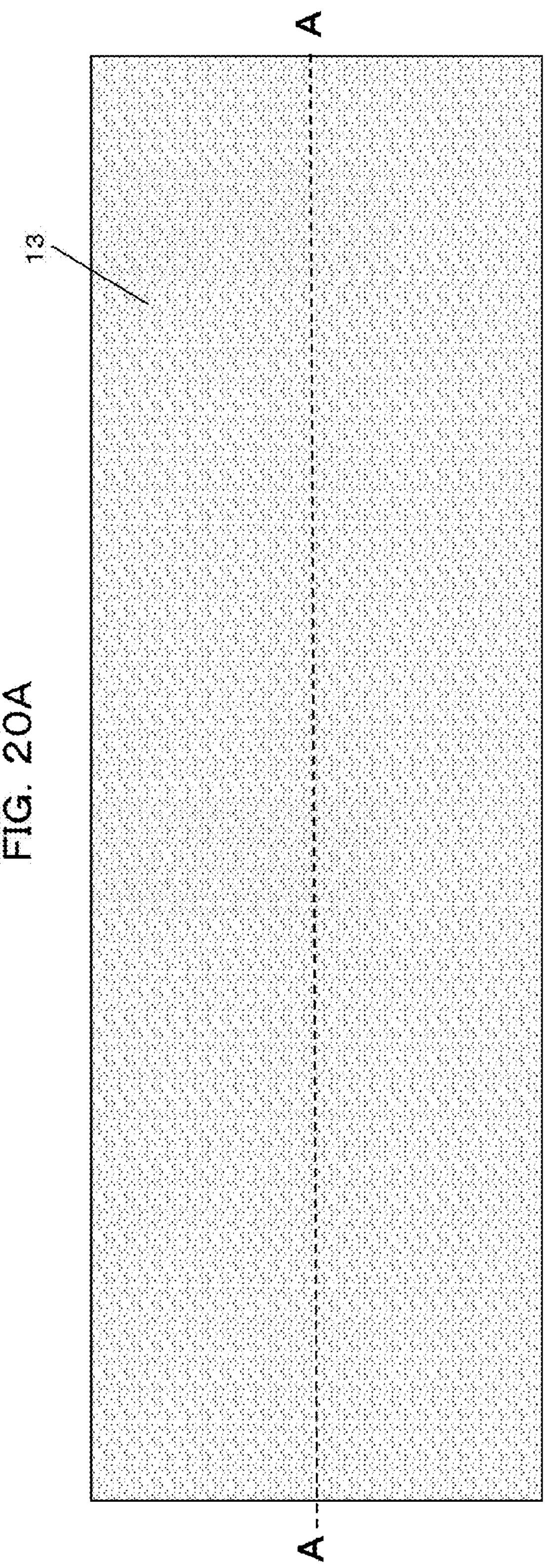
Figure 20B:
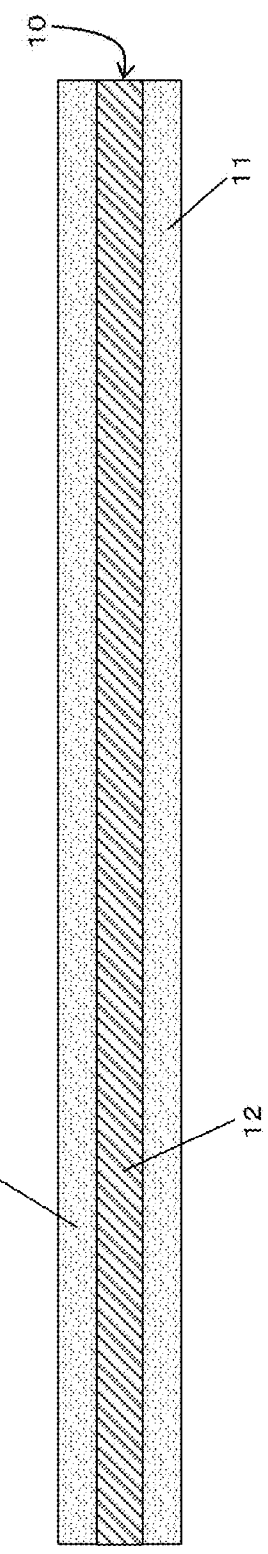

First, as depicted in FIGS. 20A and 20B, an $SiO_2$ layer 13 (for example, of a thickness of approximately 50 nm) is deposited by a CVD method on an SOI substrate 10 (wherein the thickness of a BOX layer 11 that is an $SiO_2$ layer is approximately 3 μm, and the thickness of an SOI layer 12 that is a silicon layer is approximately 150 nm). Here, as material gas, $SiH_4$ (20%)/He and $N_2O$ may be used.

Figure 21A:
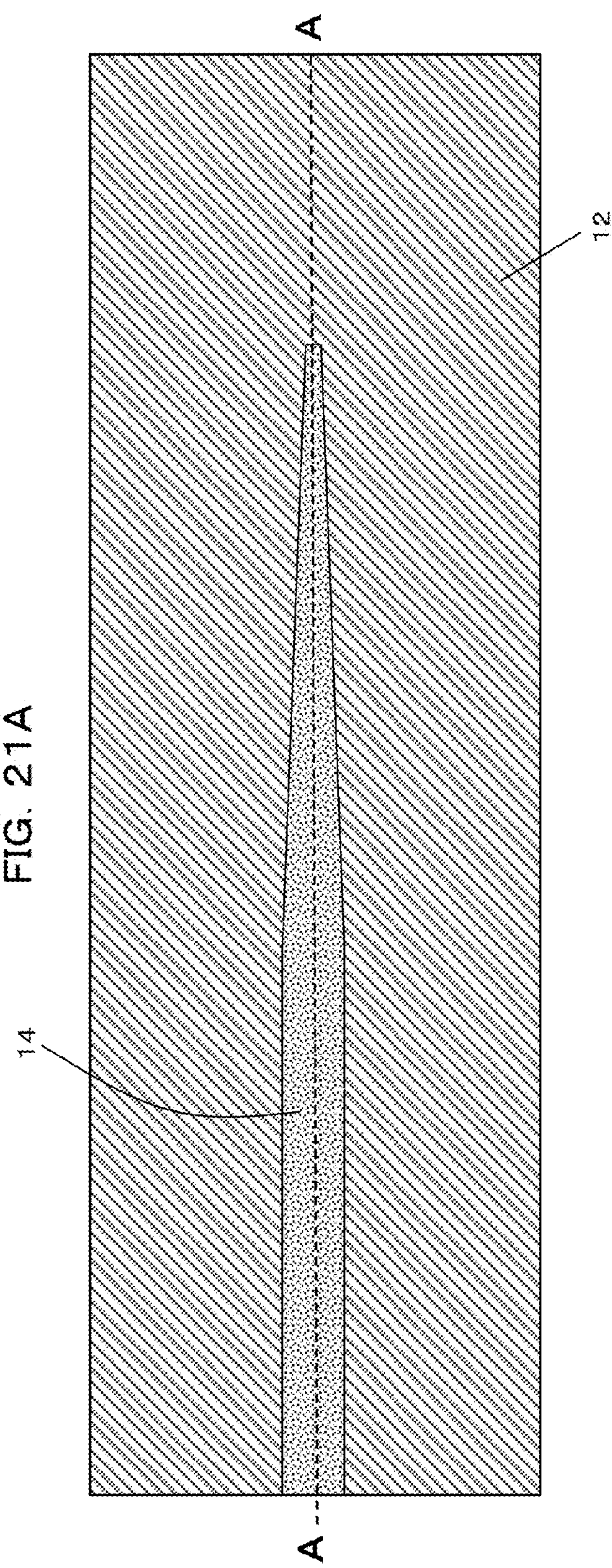
Figure 21B:
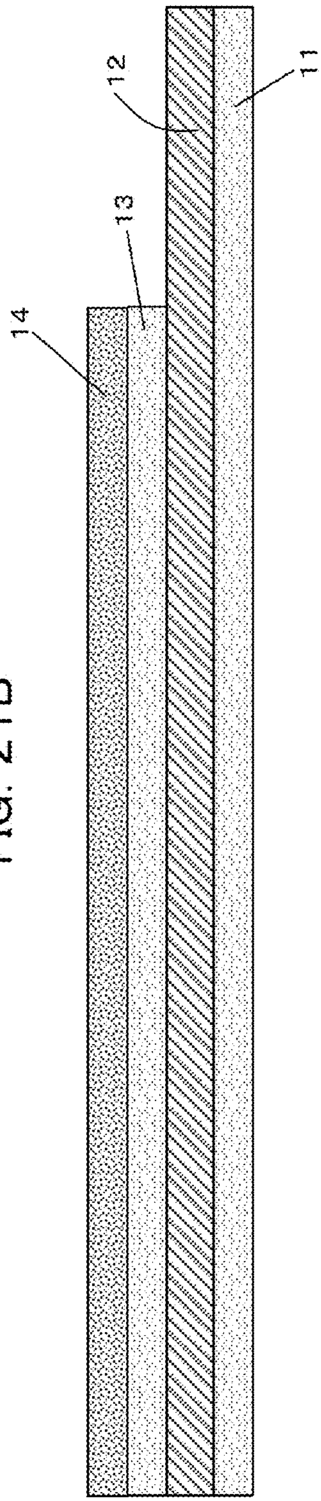
Figures 22A, 22B:
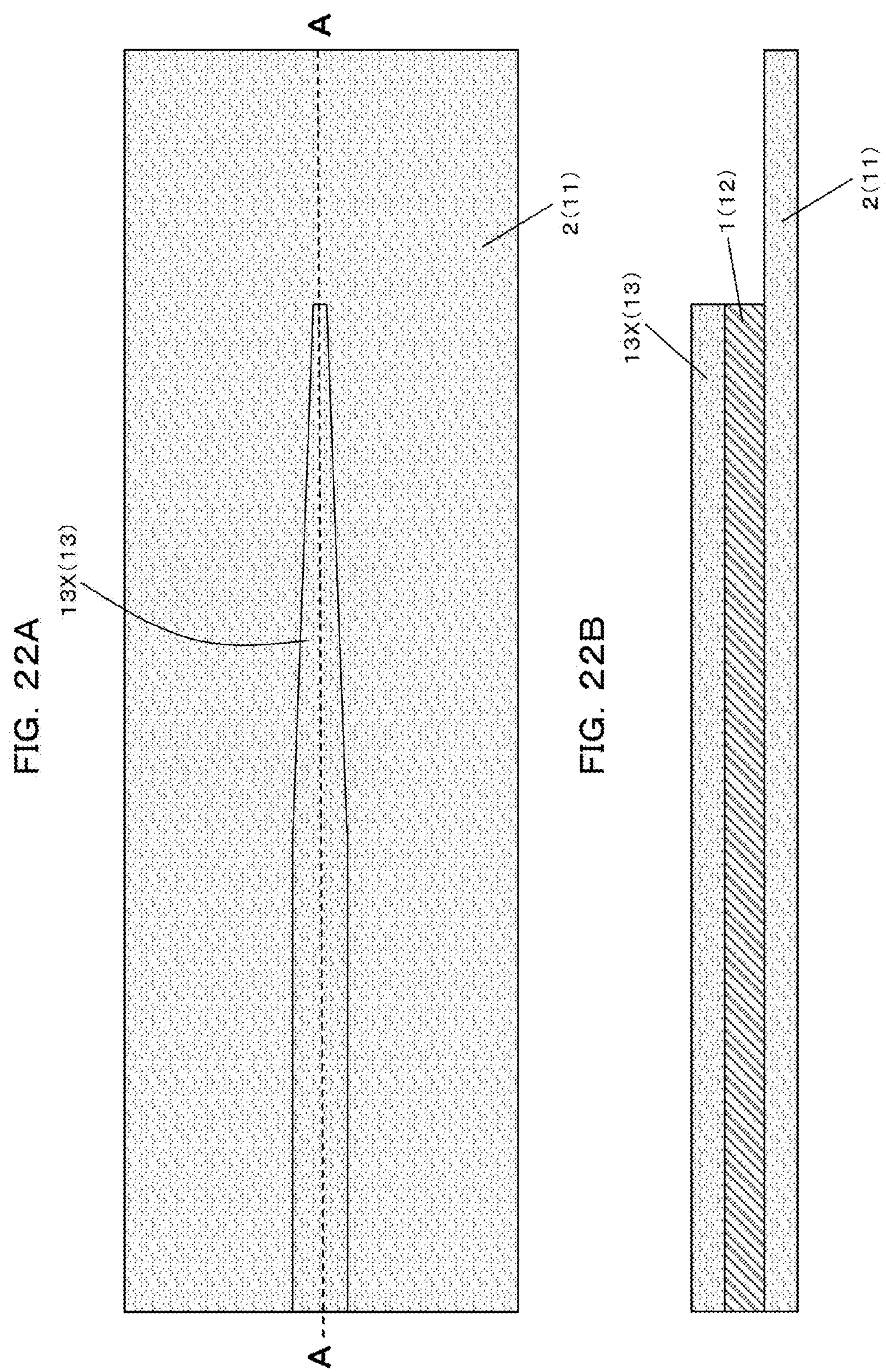

Then, as depicted in FIGS. 21A and 21B, a photoresist pattern 14 is formed on the $SiO_2$ layer 13 and the $SiO_2$ layer 13 is etched by RIE using $CF_4$ gas. Then, as depicted in FIGS. 22A and 22B, the SOI layer 12 is processed to form a hard mask pattern 13X for forming the silicon waveguide core 1 and then the photoresist pattern 14 is removed.

Then, using the hard mask pattern 13X, the SOI layer 12 that is a silicon layer is etched by RIE using HBr gas. Consequently, a silicon waveguide core 1 having the fixed width region 1D and the width taper region 1E is formed. Further, the BOX layer 11 is exposed at both sides of the silicon waveguide core 1 and functions as the $SiO_2$ lower cladding layer 2.

Figure 23A:
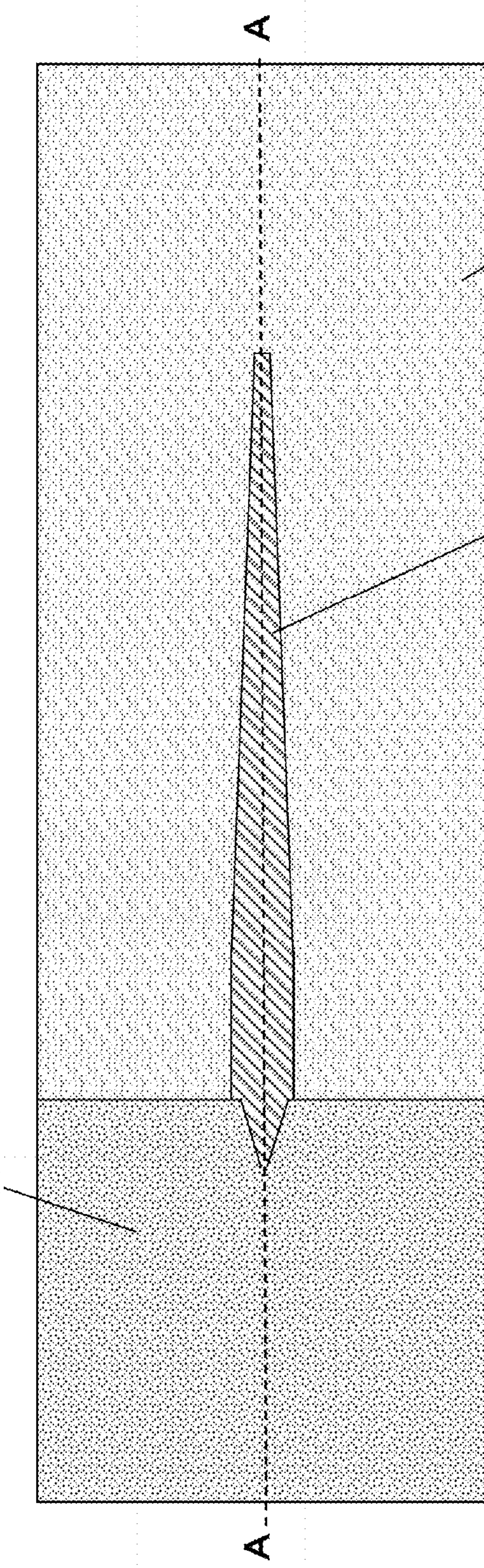
Figure 23B:
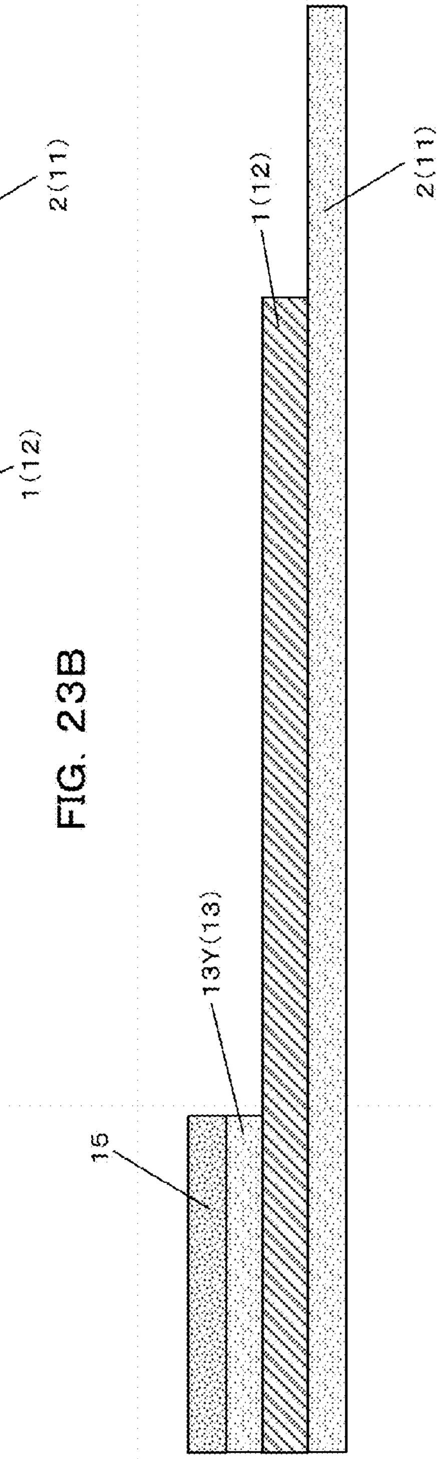
Figure 24A:
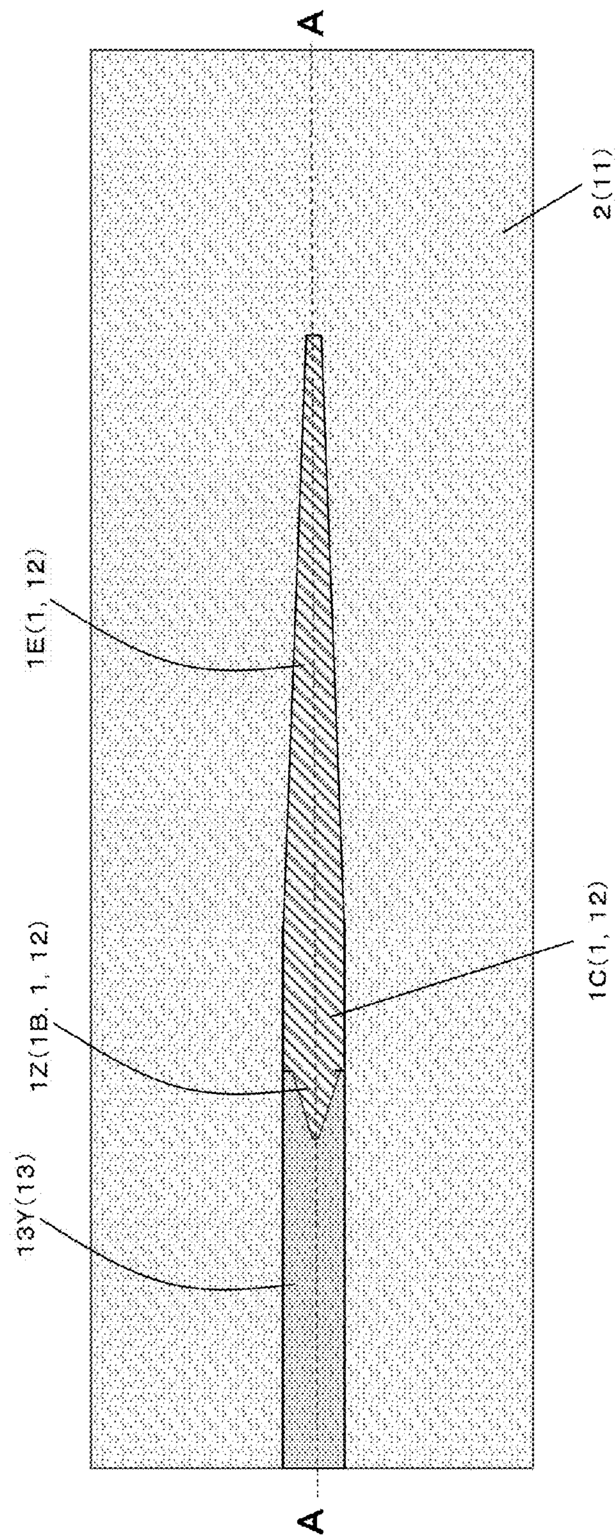
Figure 24B:
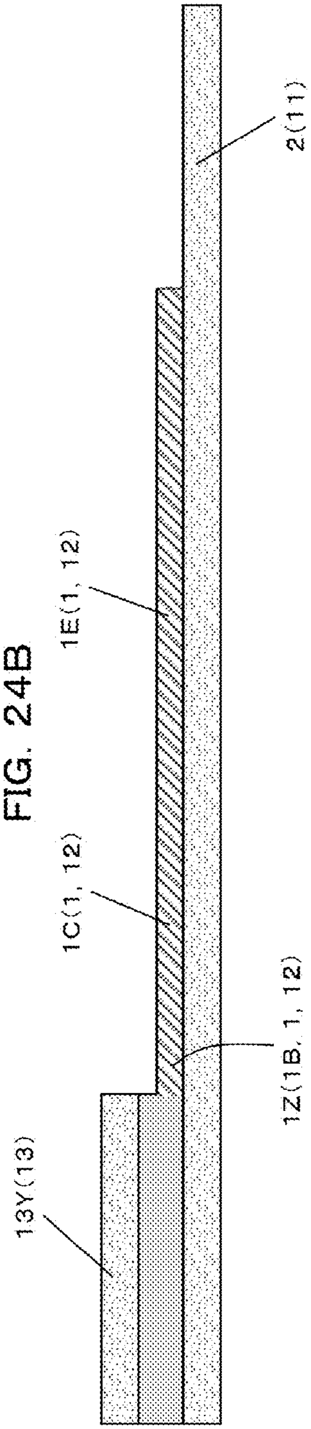

Then, as depicted in FIGS. 23A and 23B, a photoresist pattern 15 is formed on a hard mask pattern 13Y and the hard mask pattern 13Y is etched by RIE using $CF_4$. Then, as depicted in FIGS. 24A and 24B, the SOI layer 12 is processed to form a thin film region 1Z of a second region 1B and a third region 1C of a fixed width region 1D of the silicon waveguide core 1 and a hard mask pattern 13Y for reducing the thickness of a width taper region 1E. It is to be noted that the silicon waveguide core 1 is depicted in FIG. 24A so as to be viewed. Further, in FIG. 24B, patterns different from each other are applied to a thin region and a thick region of the silicon waveguide core 1 so as to correspond to FIGS. 18A to 18F.

Figures 25A, 25B:
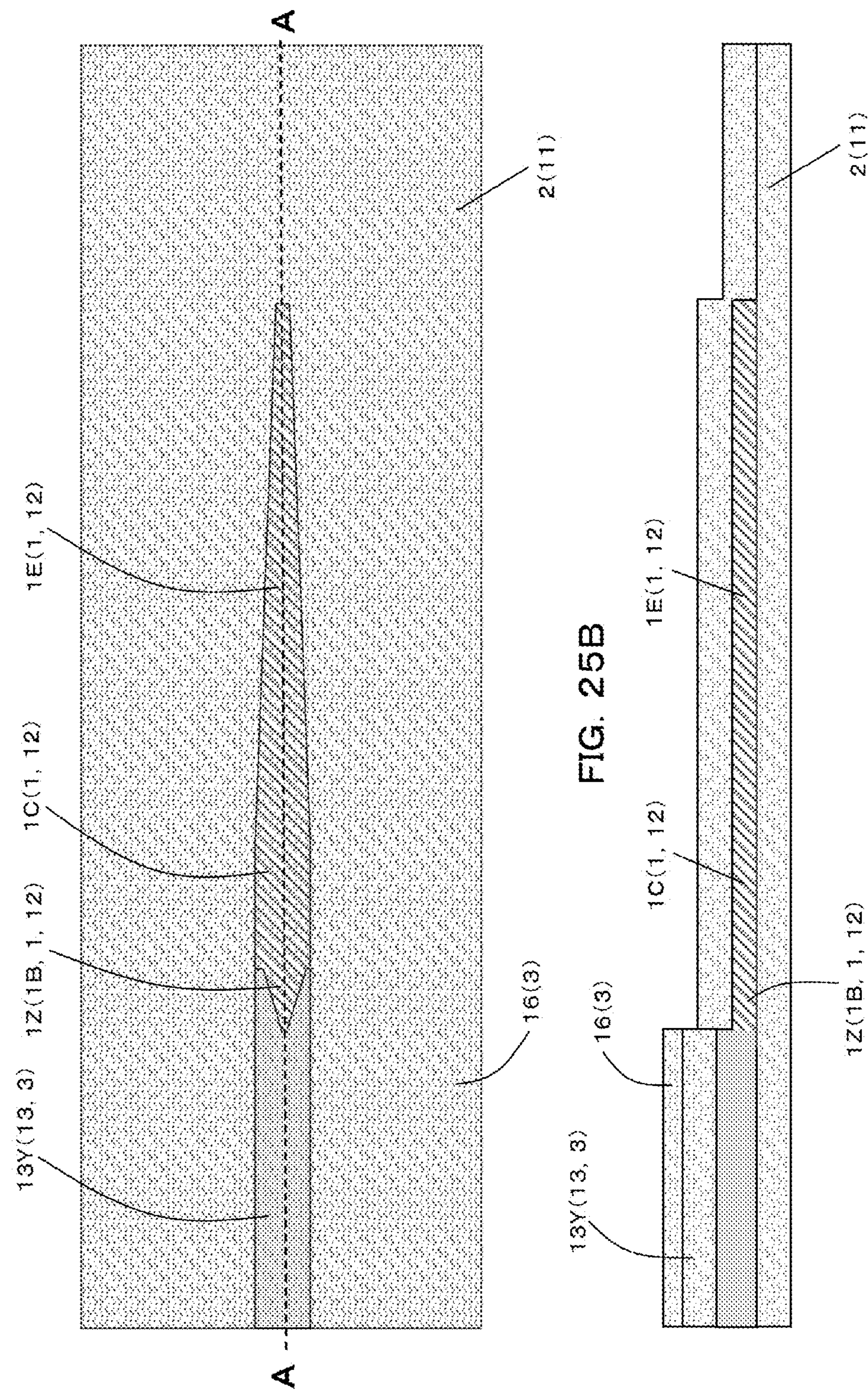

Then, after the photoresist pattern 15 is removed, as depicted in FIGS. 25A and 25B, using the hard mask pattern 13Y, the SOI layer 12 that is a silicon layer is etched by approximately 60 nm using HBr gas to set the thickness to approximately 90 nm thereby to reduce the thickness of the thin film region 1Z of the second region 1B and third region 1C of the fixed width region 1D of the silicon waveguide core 1 and the width taper region 1E. Consequently, a step 1X of approximately 60 nm in the thicknesswise direction is formed in the second region 1B of the fixed width region 1D of the silicon waveguide core 1 and the thickness of the width taper region 1E becomes to approximately 90 nm.

Figures 26A, 26B:
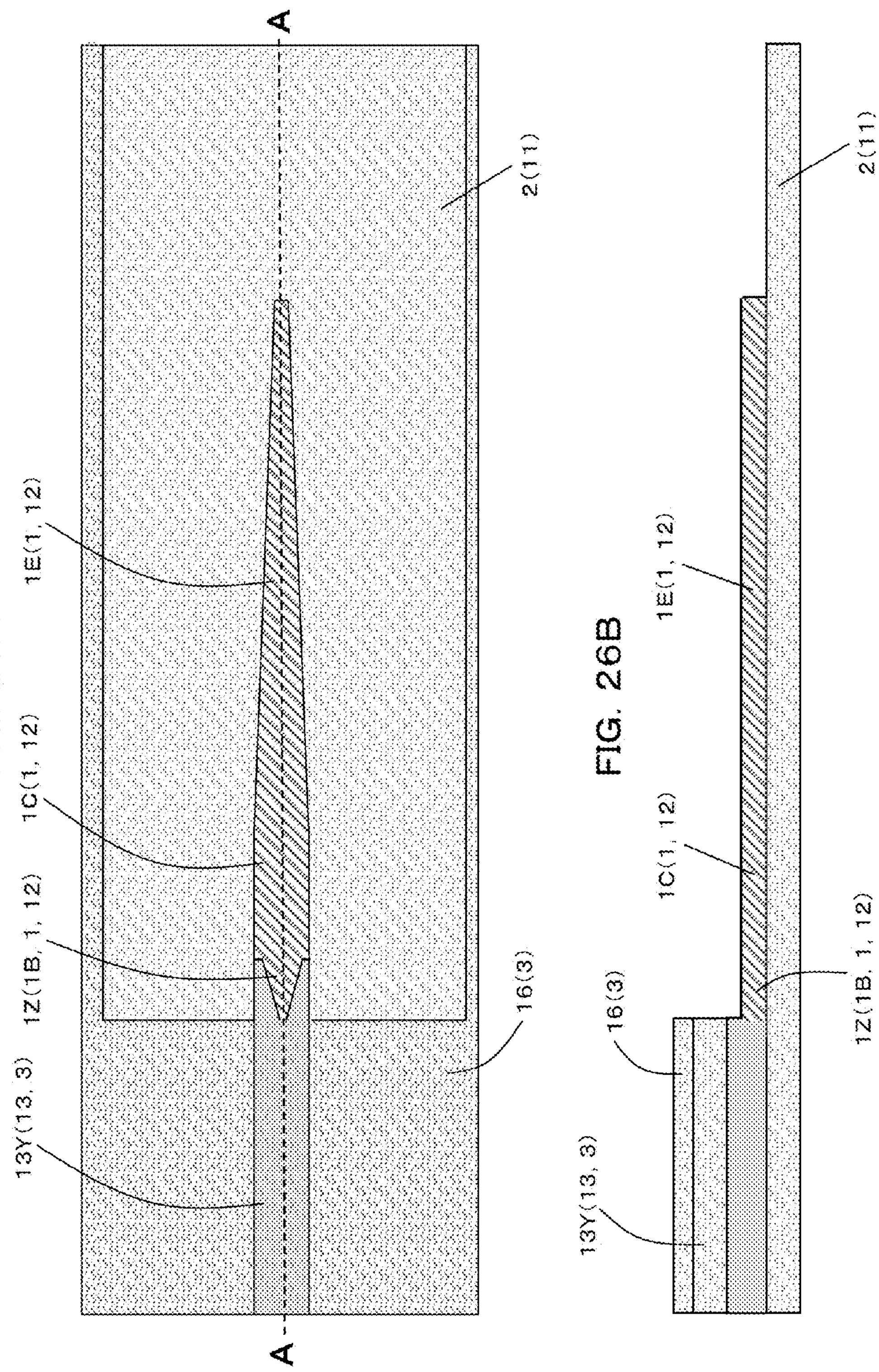

Then, as depicted in FIGS. 25A and 25B, an $SiO_2$ film 16 (for example, of a thickness of approximately 1 μm) is deposited by a CVD method and, as depicted in FIGS. 26A and 26B, the $SiO_2$ film 16 from which a second core 4 is to be formed is removed by etching. It is to be noted that, in FIGS. 25A and 26A, the silicon waveguide core 1 is depicted so as to be viewed. Further, in FIGS. 25B and 26B, patterns different from each other are applied to a thin region and a thick region of the silicon waveguide core 1 so as to correspond to FIGS. 18A to 18F.

Figure 27A:
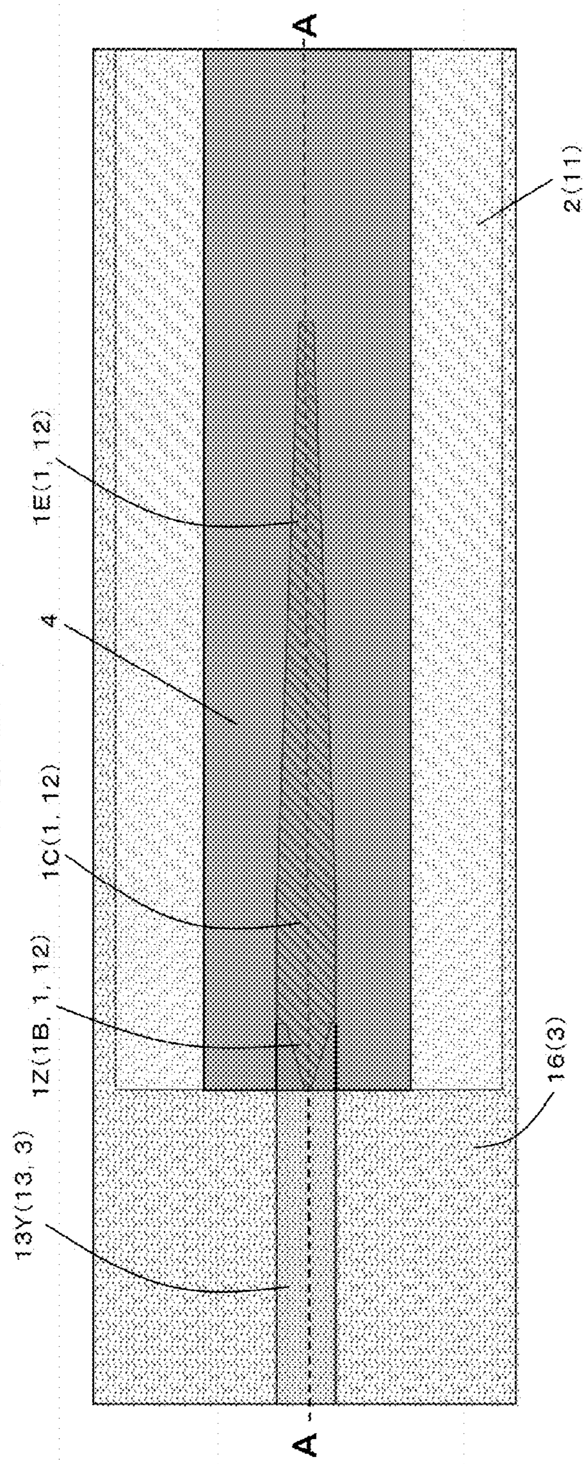
Figure 27B:
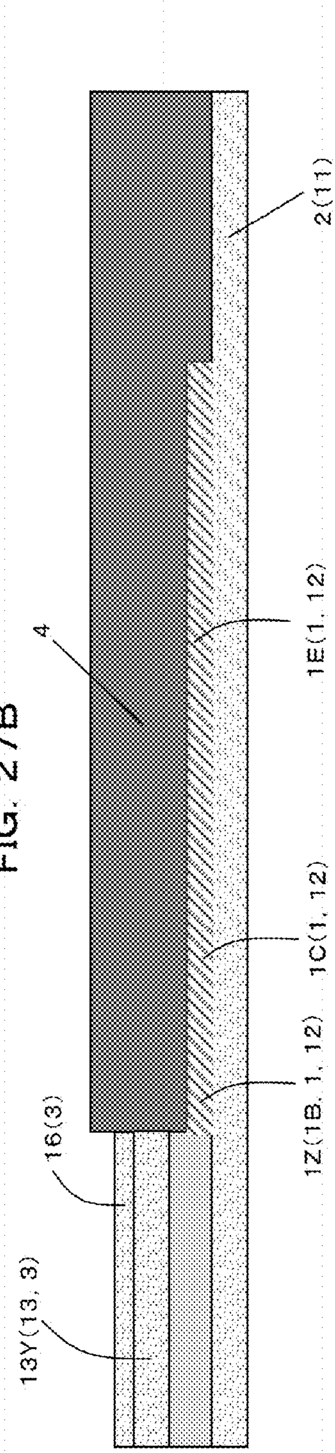

Next, as depicted in FIGS. 27A and 27B, an $SiO_X$ film (for example, of a thickness of approximately 3 μm, a width of approximately 7 μm, and a refractive index n=1.48) is deposited by a CVD method. Then, by removing an unnecessary portion of the $SiO_X$ film by etching, a second core 4 is formed so as to cover the width taper region 1E and part of the fixed width region 1D of the silicon waveguide core 1. It is to be noted that, in FIG. 27A, the silicon waveguide core 1 is depicted so as to be viewed. Further, in FIG. 27B, patterns different from each other are applied to a thin region and a thick region of the silicon waveguide core 1 so as to correspond to FIGS. 18A to 18F.

Figure 28A:
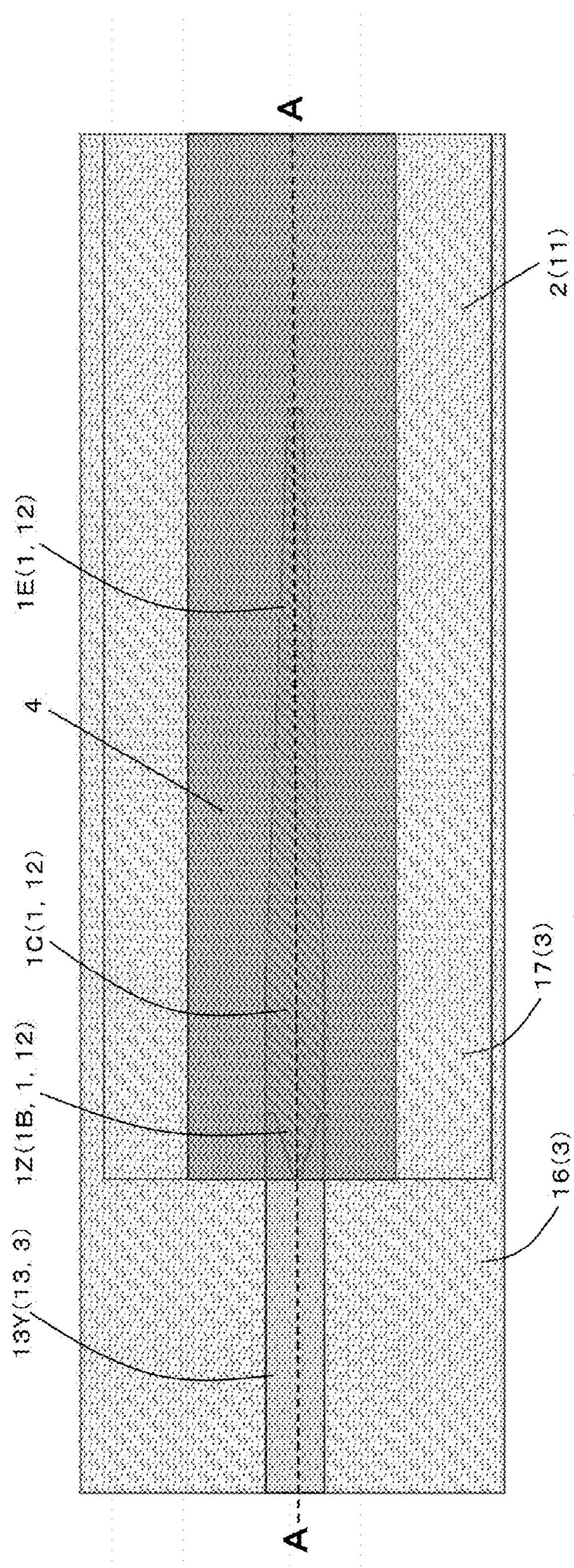
Figure 28B:
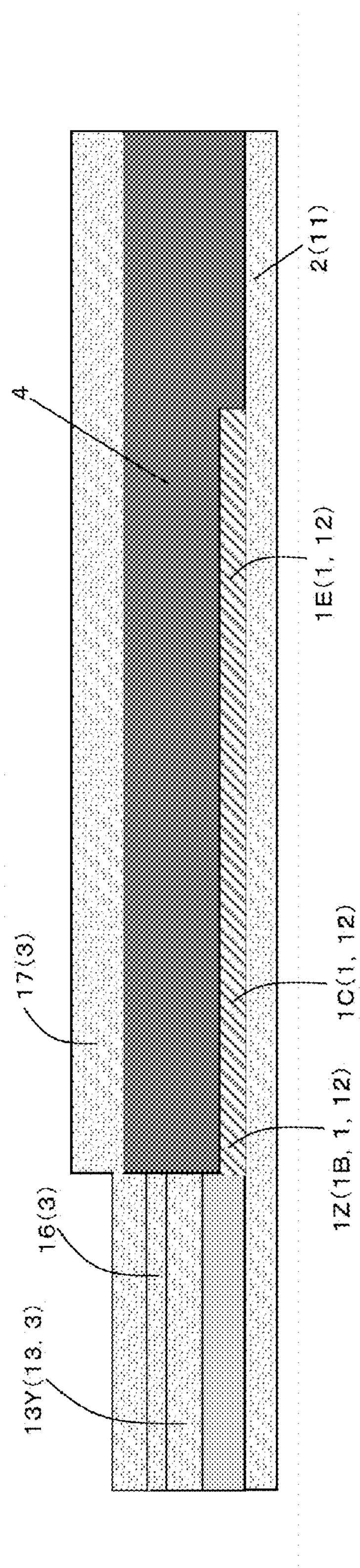

Then, as depicted in FIGS. 28A and 28B, an $SiO_2$ film 17 (for example, of a thickness of approximately 1 μm) is deposited by a CVD method so as to cover the silicon waveguide core 1 and the second core 4 to form a $SiO_2$ upper cladding layer 3 configured from the $SiO_2$ films 13, 16 and 17 thereby to fabricate a spot size converter including such a configuration of the particular example as described above. It is to be noted that, in FIG. 28A, the silicon waveguide core 1 is depicted so as to be viewed. Further, in FIG. 28B, patterns different from each other are applied to a thin region and a thick region of the silicon waveguide core 1 so as to correspond to FIGS. 18A to 18F.

Accordingly, with the spot size converter according to the present embodiment, there is an advantage that the region 1B including the step 1X of the silicon waveguide core 1 at which the thickness varies can be easily fabricated and suppression of loss to a low level and a low polarization dependency can be implemented. Further, with the spot size converter according to the present embodiment, there is an advantage that the spot size can be sufficiently enlarged and suppression of loss to a low level (increase in efficiency) and a low polarization dependency of coupling with a dispersion shift fiber or a single mode fiber can be implemented. In particular, there is an advantage that a spot size converter capable of implementing coupling with a dispersion shift fiber or a single mode fiber with a high efficiency and a low polarization dependency can be implemented.

It is to be noted that, while the refractive index of the second core 4, namely, the refractive index of the material of the second core 4, is approximately 1.48 in the particular example of the embodiment described above, the second core is not limited to this. For example, in order to implement suppression of loss to a low level (increase in efficiency) and a low polarization dependency of coupling with a dispersion shift fiber or a single mode fiber, the refractive index of the second core 4 may be set to approximately 1.45 or more but approximately 1.48 or less. It is to be noted that, while the spot size reduces and coupling loss with a dispersion shift fiber or a single mode fiber increases as the refractive index of the second core 4 increases, such a situation that the condition for the width (tip end width) of the tip end portion of the width taper region 1E of the silicon waveguide core 1 is relaxed, namely, the range of the tip end width capable of implementing low polarization dependency is increased and increase of the polarization dependency can be suppressed readily.

Figure 29:
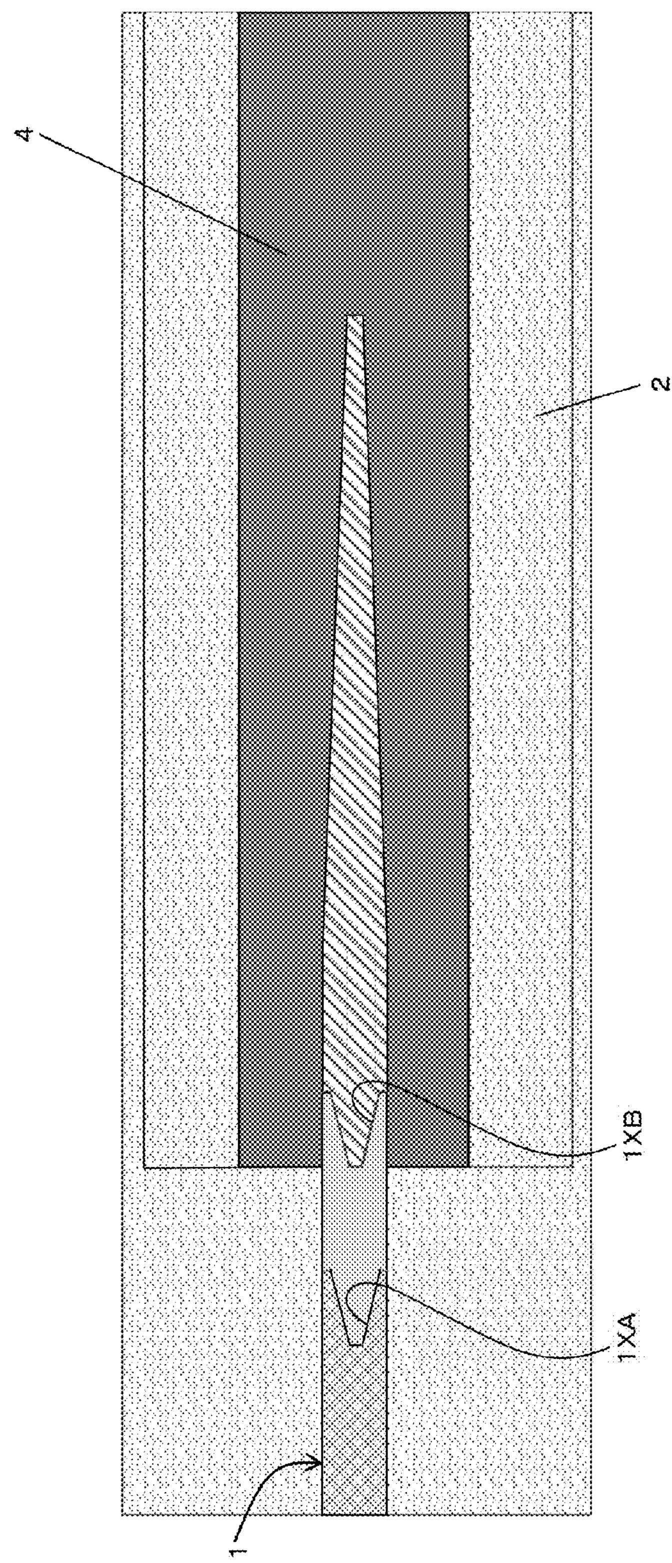
FIG. 29 is a schematic top plan view depicting a configuration of a spot size converter according to a modification to the second embodiment.

Further, while, in the particular example of the embodiment described above, the SOI substrate (SOI wafer), in which the thickness of the SOI layer 12 is approximately 150 nm is used and the step 1X having a height of approximately 60 nm is provided in the fixed width region 1D of the silicon waveguide core 1, is provided by applying the step structure of the first embodiment described above and besides the thickness of the width taper region 1E (particularly, the thickness of the tip end portion of the width taper region 1E) is set to approximately 90 nm, the embodiment is not limited to this. For example, such a configuration may be applied that an SOI substrate in which the thickness of the SOI layer 12 is approximately 220 nm is used and the step 1X having a height of approximately 70 nm is provided in the fixed width region 1D of the silicon waveguide core 1 by applying the step structure of the first embodiment described above and besides the thickness of the width taper region 1E (particularly, the thickness of the tip end portion of the width taper region 1E) is set to approximately 150 nm. Further, such a configuration may be applied that an SOI substrate in which the thickness of the SOI layer 12 is approximately 220 nm is used and, as depicted, for example, in FIG. 29, a step 1XA having a height of approximately 70 nm is provided in the fixed width region 1D of the silicon waveguide core 1 by applying the step structure of the first embodiment described above and besides the thickness is set to approximately 150 nm, and, further, a step 1XB having a height of approximately 60 nm is provided in the fixed width region 1D of the silicon waveguide core 1 by applying the step structure of the first embodiment described above and besides the thickness of the width taper region 1E (particularly, the thickness of the tip end portion of the width taper region 1E) is set to approximately 90 nm. If the step is provided in the fixed width region 1D of the silicon waveguide core 1 and the thickness of the width taper region 1E (particularly, the thickness of the tip end portion of the width taper region 1E) of the silicon waveguide core 1 is reduced in this manner, then the loss when light transits from the silicon waveguide core 1 to the second core 4 can be suppressed low and suppression of loss to a low level (increase in efficiency) and a low polarization dependency of coupling with a dispersion shift fiber or a single mode fiber can be implemented. It is to be noted that the upper cladding layer 3 is not depicted in FIG. 29. Further, for the convenience of illustration, the silicon waveguide core 1 buried in the second core 4 is depicted in FIG. 29 so as to be exposed. Further, patterns different from each other are applied to regions whose thickness are different from each other of the silicon waveguide core 1 in FIG. 29.

Further, while, in the embodiment and the particular example described above, the second region 1B having the step 1X is provided in the region, which is covered with the second core 4, of the fixed width region 1D of the silicon waveguide core 1, the provision of the second region 1B having the step 1X is not limited to this and the second region 1B having the step 1X may be provided in the fixed width region 1D of the silicon waveguide core 1. For example, the second region 1B having the step 1X may be provided in a region, which is not covered with the second core 4, of the fixed width region 1D of the silicon waveguide core 1.

Further, while the second core 4 is provided above (over) the silicon waveguide core 1 in the embodiment and the modification described above, the embodiment is not limited to this and, for example, the second core may be provided below (under) or at the side of the silicon waveguide core.

Further, while $SiO_X$ is used as a material of the second core 4 in the embodiment and modification described above, the material of the second core 4 is not limited to this. For example, as a material of the second core 4, a different silicon compound such as SiON (silicon oxynitride) or a polymer may be used. In particular, the second core 4 may be a silicon compound waveguide core for which a silicon compound such as $SiO_X$ or SiON is used or may be a polymer waveguide core for which a polymer is used. However, where SiON is used as a material of the second core 4, since absorption loss by N—H group occurs, it is preferable to set the length of the second core 4 as short as possible.

Further, an optical apparatus can be configured also by connecting a dispersion shift fiber or a single mode fiber to an end face of the second core side of the spot size converter of the embodiment and the modification described above. In this case, the optical apparatus includes the spot size converter of the embodiment and the modification described above and a dispersion shift fiber or a single mode fiber connected to an end face of the second core side of the spot size converter. For example, the optical apparatus can be configured by joining a dispersion shift fiber or a single mode fiber, for example, by adhesive or the like with an end face of the second core side of the spot size converter of the embodiment and the modification described above. As such an optical apparatus as just described, for example, an optical transmitter, an optical receiver, an optical transmitter-receiver, a light source and so forth are available.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical waveguide, comprising:

a lower cladding layer, a waveguide core provided on the lower cladding layer; wherein the waveguide core includes a first region, a second region having a step at which a thickness varies, and a third region having a thickness smaller than that of the first region, the second region has thick film regions continuing with the first region and positioned at both sides in a widthwise direction, the thick film regions having a thickness that is equal to that of the first region and having a gradually reducing width from the first region side to the third region side, and has a thin film region sandwiched by the thick film regions and continuing with the third region, the thin film region having a thickness equal to that of the third region, the first region, the second region and the third region of the waveguide core are made from a same material, lower surfaces of the first region, the third region, the thick film regions and the thin film region are contacted with an upper surface of the lower cladding layer, and the cross section perpendicular to a waveguide direction of the thick film regions and the thin film region in the second region is squarish U shaped and opened up.

2. The optical waveguide according to claim 1, wherein the thick film regions have a length of 5 μm or more.

3. The optical waveguide according to claim 2, wherein the thick film regions have a width of 50 nm or less at an end portion of the third region side; and the thick film regions and the thin film region have a thickness difference of 80 nm or less therebetween.

4. The optical waveguide according to claim 1, wherein the thick film regions have a gradually reducing width with a taper shape, a curved shape, a step shape or a shape of a combination of the shapes.

5. The optical waveguide according to claim 1, wherein an end portion of the first region side of the thin film region is provided obliquely with respect to a direction orthogonal to a direction in which the thin film region extends.

6. The optical waveguide according to claim 1, wherein the waveguide core has a fixed width.

7. The optical waveguide according to claim 1, wherein the step is provided extending from the first region side to the third region side at the boundary between the thick film regions positioned at both sides in the widthwise direction and the thin film region sandwiched by the thick film regions.

8. A spot size converter, comprising:

a lower cladding layer, a first silicon waveguide core provided on the lower cladding layer; wherein the first silicon waveguide core includes a first region, a second region having a step at which a thickness varies, and a third region having a thickness smaller than that of the first region, the first silicon waveguide core having a fixed width region having a fixed width and a width taper region continuing the fixed width region and having a width that reduces toward a terminal end portion; and a second waveguide core that covers at least the width taper region and continues with the first silicon waveguide core, the second region has thick film regions continuing with the first region and positioned at both sides in a widthwise direction, the thick film regions having a thickness that is equal to that of the first region and having a gradually reducing width from the first region side to the third region side, and has a thin film region sandwiched by the thick film regions and continuing with the third region, the thin film region having a thickness equal to that of the third region, the first region, the second region and the third region of the waveguide core are made from a same material, lower surfaces of the first region, the third region, the thick film regions and the thin film region are contacted with an upper surface of the lower cladding layer, and the cross section perpendicular to a waveguide direction of the thick film regions and the thin film region in the second region is squarish U shaped and opened up.

9. The spot size converter according to claim 8, wherein the second waveguide core covers the second region, third region and width taper region.

10. The spot size converter according to claim 8, wherein the thick film regions have a length of 5 μm or more.

11. The spot size converter according to claim 10, wherein the thick film regions have a width of 50 nm or less at an end portion of the third region side; and the thick film regions and the thin film region have a thickness difference of 80 nm or less therebetween.

12. The spot size converter according to claim 8, wherein the thick film regions have a gradually reducing width with a taper shape, a curved shape, a step shape or a shape of a combination of the shapes.

13. The spot size converter according to claim 8, wherein an end portion of the first region side of the thin film region is provided obliquely with respect to a direction orthogonal to a direction in which the thin film region extends.

14. The spot size converter according to claim 8, wherein the step is provided extending from the first region side to the third region side at the boundary between the thick film regions positioned at both sides in the widthwise direction and the thin film region sandwiched by the thick film regions.

15. An optical apparatus, comprising:

a spot size converter; and a dispersion-shifted fiber or a single-mode fiber connected to an end face of the second waveguide core side of the spot size converter; wherein the spot size converter includes:

a lower cladding layer, a first silicon waveguide core provided on the lower cladding layer; wherein the first silicon waveguide core includes a first region, a second region having a step at which a thickness varies, and a third region having a thickness smaller than that of the first region, the first silicon waveguide core having a fixed width region having a fixed width and a width taper region continuing the fixed width region and having a width that reduces toward a terminal end portion; and a second waveguide core that covers at least the width taper region and continues with the first silicon waveguide core, the second region has thick film regions continuing with the first region and positioned at both sides in a widthwise direction, the thick film regions having a thickness that is equal to that of the first region and having a gradually reducing width from the first region side to the third region side, and has a thin film region sandwiched by the thick film regions and continuing with the third region, the thin film region having a thickness equal to that of the third region, the first region, the second region and the third region of the waveguide core are made from a same material, lower surfaces of the first region, the third region, the thick film regions and the thin film region are contacted with an upper surface of the lower cladding layer, and the cross section perpendicular to a waveguide direction of the thick film regions and the thin film region in the second region is squarish U shaped and opened up.

16. The optical waveguide according to claim 1, wherein the first region, the second region and the third region of the waveguide core are made from silicon.

17. The spot size converter according to claim 8, wherein the first region, the second region and the third region of the waveguide core are made from silicon.

18. The optical apparatus according to claim 15, wherein the first region, the second region and the third region of the waveguide core are made from silicon.

19. The optical apparatus according to claim 15, wherein the step is provided extending from the first region side to the third region side at the boundary between the thick film regions positioned at both sides in the widthwise direction and the thin film region sandwiched by the thick film regions.

* * * * *